(12) United States Patent
Kamata et al.

(10) Patent No.: US 11,140,276 B2
(45) Date of Patent: Oct. 5, 2021

(54) IMAGE PROCESSING APPARATUS, NON-TRANSITORY STORAGE MEDIUM, AND IMAGE PROCESSING METHOD

(71) Applicant: CANON KABUSHIKI KAISHA, Tokyo (JP)

(72) Inventors: Yutaro Kamata, Yokohama (JP); Takashi Miyauchi, Inagi (JP); Naoki Ito, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/395,100

(22) Filed: Apr. 25, 2019

(65) Prior Publication Data
US 2019/0356790 A1 Nov. 21, 2019

(30) Foreign Application Priority Data
May 17, 2018 (JP) .............................. JP2018-095657

(51) Int. Cl.
*G06F 3/12* (2006.01)
*H04N 1/00* (2006.01)
(Continued)

(52) U.S. Cl.
CPC ....... *H04N 1/00167* (2013.01); *G06F 9/3004* (2013.01); *G06K 9/00456* (2013.01); *G06T 7/73* (2017.01)

(58) Field of Classification Search
CPC ....... H04N 1/00167; G06T 7/73; G06T 11/00; G06K 9/00456; G06F 9/3004
See application file for complete search history.

(56) References Cited

U.S. PATENT DOCUMENTS

2004/0150856 A1* 8/2004 Asai ....................... G03G 15/36
358/1.18
2008/0297811 A1* 12/2008 Pierce ................ H04N 1/00416
358/1.6
(Continued)

FOREIGN PATENT DOCUMENTS

| JP | 07-261599 A | 10/1995 |
|----|-------------|---------|
| JP | 2004248262 A | 9/2004 |
| JP | 2011055131 A | 3/2011 |

OTHER PUBLICATIONS

Basic PDF Printing tasks https://web.archive.org/web/20121103010510/ https://helpx.adobe.com/acrobat/using/basic-pdf-printing-tasks.html. (Year: 2012).*

*Primary Examiner* — Huo Long Chen
(74) *Attorney, Agent, or Firm* — Canon U.S.A., Inc. IP Division

(57) ABSTRACT

An image processing apparatus performs operations. A mode is designated in repeat layout processing. A document area is detected by performing image analysis processing on a scanned image, and an inclination-corrected document image is acquired by performing extraction and inclination correction of a document image based on the detected document area. An initial repeat target area position is determined based on the acquired inclination-corrected document image and the designated mode, the inclination-corrected document image and a frame indicating the determined position are displayed, and a repeat target area designation screen is displayed to change a position of the frame indicating the repeat target area based on a user instruction. An output image is generated after the repeat layout processing by repeatedly laying out, in a designated sheet size, an image of the repeat target area determined based on the frame set on the repeat target area designation screen.

15 Claims, 17 Drawing Sheets

(51) Int. Cl.
*G06T 7/73* (2017.01)
*G06K 9/00* (2006.01)
*G06F 9/30* (2018.01)

(56) References Cited

U.S. PATENT DOCUMENTS

2017/0066263 A1* 3/2017 Inoue .................... G03G 15/36
2018/0077309 A1* 3/2018 Saitoh .................. H04N 1/3873

* cited by examiner

IMAGE PROCESSING APPARATUS, NON-TRANSITORY STORAGE MEDIUM, AND IMAGE PROCESSING METHOD

BACKGROUND OF THE INVENTION

Field of the Invention

The present disclosure relates to image repeat processing in which a partial area inside a scanned image is used as a repeat target image, and the repeat target image is repeatedly arranged and printed on one recoding sheet.

Description of the Related Art

Some image processing apparatuses (image forming apparatuses) such as copying machines and multifunctional peripherals include a function of image repeat printing. The image repeat printing is a function in which a part of or whole of an image of one document (document image) read by a scanner is used as a repeat target image, and the repeat target image is repeatedly arranged and printed on one recording sheet. Japanese Patent Application Laid-Open No. 2004-248262 discusses that a user can select whether to add a margin between the repeat target images adjacent to each other in repeat arrangement, and the user can set the number of repetitions in a vertical direction and the number of repetitions in a lateral direction.

Japanese Patent Application Laid-Open No. H07-261599 discusses that a number-of-repetitions priority mode A and a magnification priority mode B are provided. When a user designates the number-of-repetitions priority mode A and sets the number of repetitions, a magnification of the repeat image is automatically reduced, and the reduced repeat image is arranged in a previously-designated sheet size in such a manner that the set number of repetitions of the repeat image is fitted in the sheet size. Further, in a case where the magnification priority mode B is designated, when the user designates a magnification, the maximum number of repetitions at the designated magnification is calculated and the maximum number of repetitions of the repeat image is arranged.

Japanese Patent Application Laid-Open No. 2011-055131 discusses that an image read by a scanner is displayed, a user designates vertices of a square frame on the displayed image, a part of the image corresponding to the square frame is extracted, and the extracted image is repeatedly arranged and printed as the repeat target image.

SUMMARY OF THE INVENTION

According to an aspect of the present disclosure, an image processing apparatus includes a memory that stores a program, and at least one processor that executes the program to perform operations including: designating a mode in repeat layout processing, detecting a document area by performing image analysis processing on a scanned image, and acquiring an inclination-corrected document image by performing extraction and inclination correction of a document image based on the detected document area, determining a position of an initial repeat target area based on the acquired inclination-corrected document image and the designated mode, displaying the inclination-corrected document image and a frame indicating the determined position of the initial repeat target area, and displaying a repeat target area designation screen to change a position of the frame indicating the repeat target area based on an instruction by a user, generating an output image after the repeat layout processing by repeatedly laying out, in a designated sheet size, an image of the repeat target area determined based on the frame set on the repeat target area designation screen, and performing control to perform print processing using the output image after the repeat layout processing.

Further features of the present disclosure will become apparent from the following description of embodiments with reference to the attached drawings.

DESCRIPTION OF THE EMBODIMENTS

In the technique discussed in Japanese Patent Application Laid-Open No. 2011-055131, it is necessary for the user to manually designate the vertices of the square frame to designate the repeat target image.

Meanwhile, the applicants examine that the repeat target area is initially displayed on a scanned image in a case where image repeat printing is designated. When the repeat target area is initially displayed and the presented area is satisfactory for the user, it is only necessary for the user to press a print start button, which enhances usability for the user. Further, the applicants also consider the image repeat printing function including a plurality of modes. Accordingly, in the following, embodiments are described in which a position of the repeat target area to be initially displayed is appropriately determined and displayed when the mode is designated or switched, to refine the usability for the user.

In the following description, embodiments of the present disclosure are described in detail with reference to the drawings. Components described in the embodiments are illustrative and do not intend to limit the scope of the present disclosure.

<System Configuration>

Figure 1:
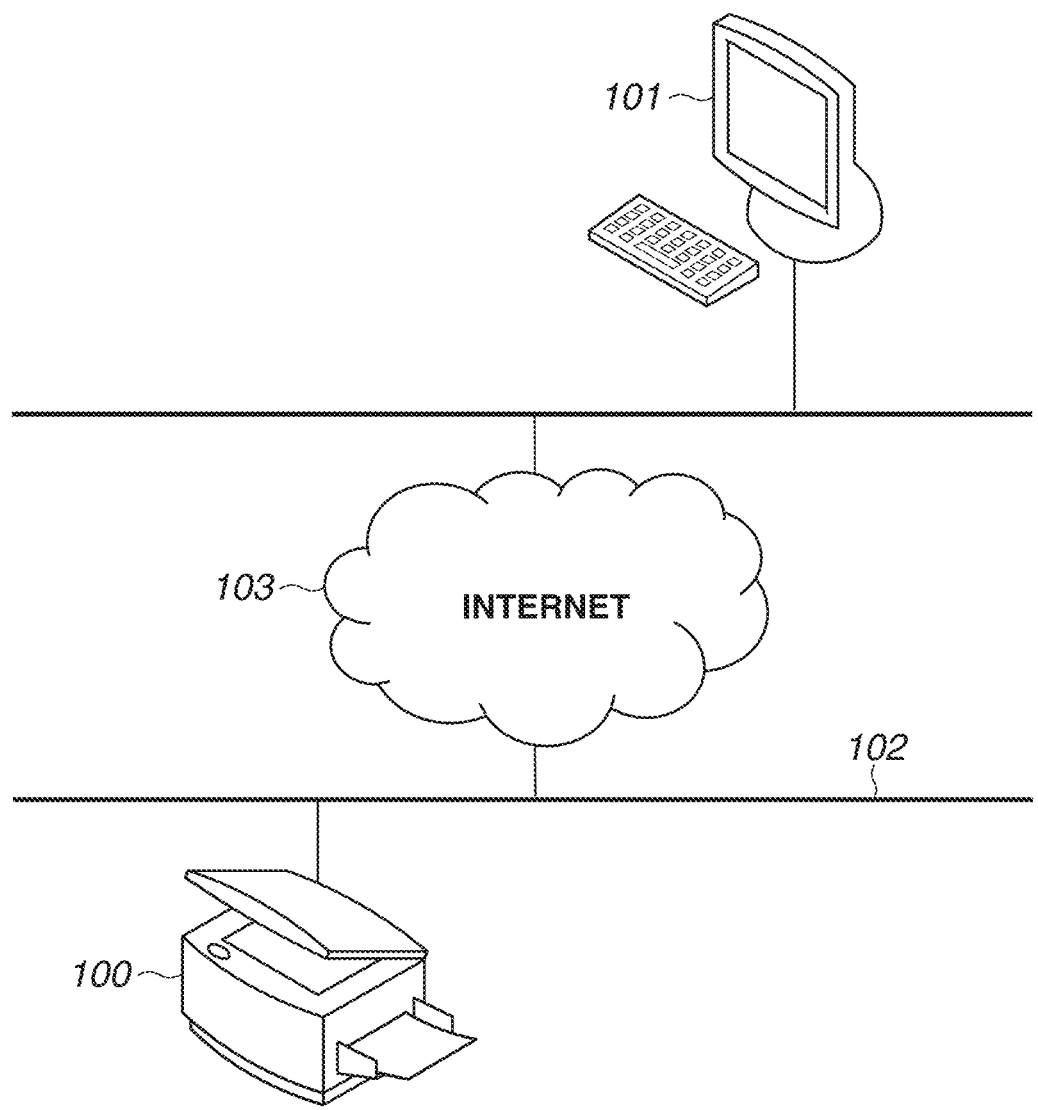
FIG. 1 illustrates an entire configuration example of a system.

FIG. 1 is a diagram illustrating an entire configuration of a system to which a first embodiment is applicable. As illustrated in FIG. 1, an image processing apparatus (image processing apparatus) 100 is connected to a local area network (LAN) 102, and is communicable with a terminal 101 such as a personal computer (PC) through the Internet 103 or other networks. The terminal 101 such as a PC is not essential for realizing the present embodiment, and a configuration including only the image processing apparatus 100 may be sufficient.

The image processing apparatus (image processing apparatus) 100 is a multifunctional peripheral (MFP) that includes a display/operation unit, a scanner unit, and a printer unit, and is usable as a scan terminal that scans a document (such as a document, business card, picture for certification, license, and postcard) with use of the scanner unit. The display/operation unit including a touch panel and hardware buttons displays a scanned image and a preview image as a result of layout processing, and displays a user interface to receive an instruction from a user. In the present embodiment, a document area is detected in a scanned image, and a manual extraction screen is presented to the user based on detected information. Further, repeat layout processing (also referred to as image repeat processing) to repeatedly lay out an image in an area manually designated by the user as a processing target, in one output document is executed, and the preview image as the result of the layout processing is displayed on a screen. When the user presses a print start button on the preview screen, print processing is performed by the printer unit.

In the present embodiment, an example in which the image processing apparatus 100 performs scan processing, repeat layout processing, and print processing is described; however, the system may be configured in such a manner that a part of the processing is performed by another terminal 101. For example, the image processing apparatus 100 may perform the scan processing and the repeat layout processing and transmit the resultant image of the layout processing to the other terminal 101 through the network, and the other terminal 101 may print the image.

<Hardware Configuration of Image Processing Apparatus 100>

Figure 2:
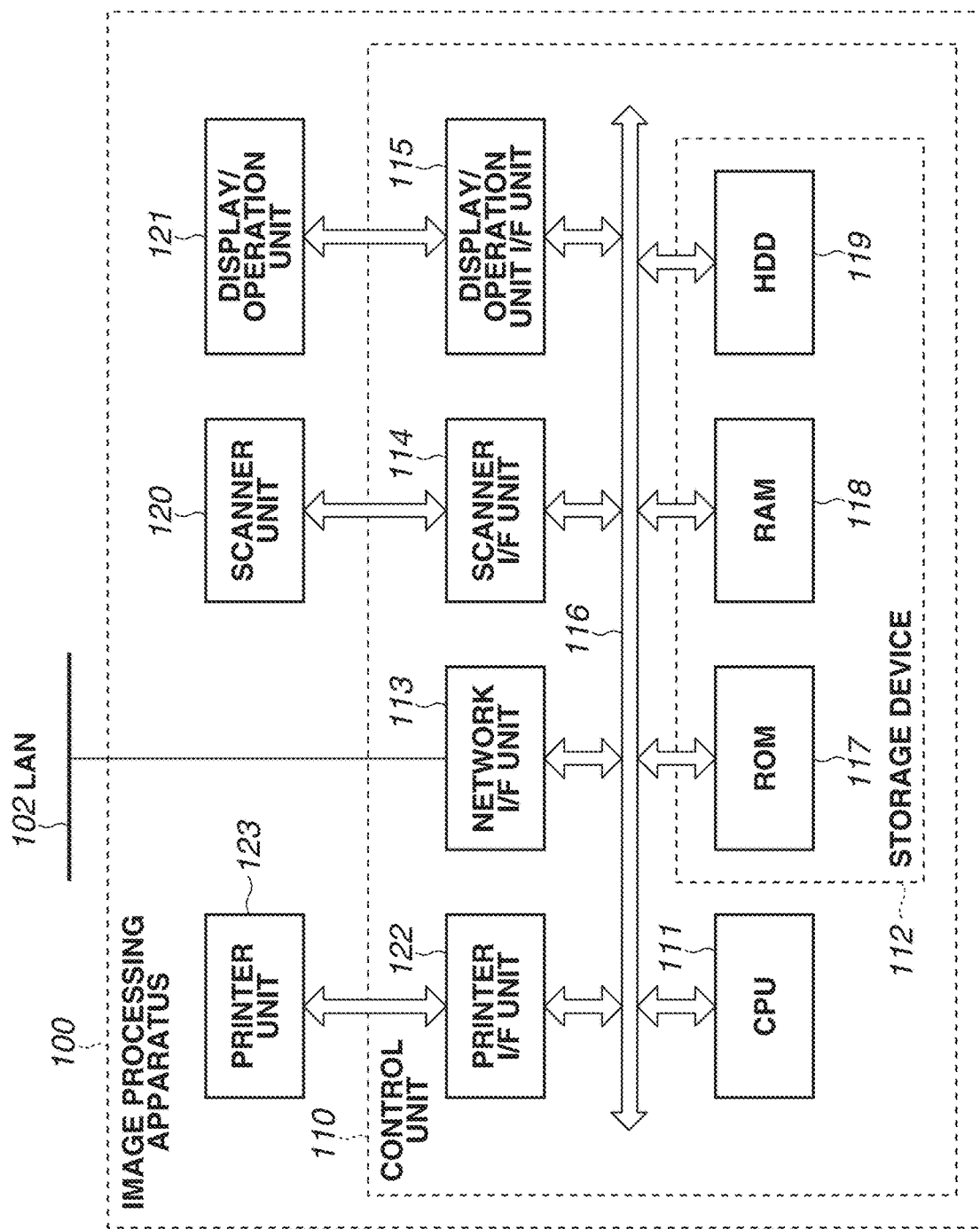
FIG. 2 is a block diagram illustrating a hardware configuration example of an image processing apparatus (image forming apparatus).

FIG. 2 is a block diagram illustrating a configuration of the image processing apparatus 100. In a control unit 110, a central processing unit (CPU) 111, a storage device 112 including a read-only memory (ROM) 117, a random access memory (RAM) 118, a hard disk drive (HDD) 119, a network interface (I/F) unit 113, a scanner I/F unit 114, a display/operation unit I/F unit 115, and a printer I/F unit 122 are connected so as to be communicable with one another through a system bus 116. The control unit 110 controls operation of the entire image processing apparatus 100.

The CPU 111 reads out and executes a control program stored in the storage device 12, to execute processing including a read control, a display control, and a print control illustrated in flowcharts described below. The storage device 112 stores and holds the above-described program, image data, meta data, setting data, processing result data, etc. The storage device 112 includes the ROM 117 as a nonvolatile nemory, the RAM 118 as a volatile memory, and the HDD 119 as a large-capacity storage area. The ROM 117 is a nonvolatile memory holding the control program, etc., and the CPU 111 reads out the control program and performs control. The RAM 118 is a volatile memory used as a main memory and a temporarily storage area such as a work area of the CPU 111.

The network I/F unit 113 connects the control unit 110 (image processing apparatus 100) to the LAN 102 through the system bus 116. The network I/F 113 transmits image data to an external apparatus on the LAN 102, and receives various kinds of information from an external apparatus on the LAN 102.

The scanner I/F unit 114 connects a scanner unit 120 and the control unit 110 through the system bus 116. The scanner unit 120 reads the image of the document to generate scanned image data, and inputs the scanned image data to the control unit 110 through the scanner I/F unit 114.

The display/operation unit I/F unit 115 connects a display/operation unit 121 and the control unit 110 through the system bus 116. The display/operation unit 121 is provided with a liquid crystal display unit having a touch panel function, and a keyboard.

The printer I/F unit 122 connects the printer unit 123 and the control unit 110 through the system bus 116. The printer unit 123 receives the layout-processed image data generated by the CPU 111 through the printer I/F unit 122, and performs the print processing using the received image data on a recording sheet.

As described above, the image processing apparatus 100 according to the present embodiment can provide the image processing function with the above-described hardware configuration.

<Image Repeat Processing Function>

As the image processing function according to the present embodiment, the image repeat processing (repeat layout processing)) is described. The image repeat processing according to the present embodiment includes a plurality of output modes. In the present embodiment, in a case where a non-scaling mode (first mode) is designated as the output mode, the image extracted based on the repeat target area is repeatedly arranged in a non-scaled size to generate an output image. In a case where a scaling mode (second mode) is designated as the output mode, the user is prompted to designate an output size of the repeat target image in printing, the image extracted based on the repeat target area is scaled to the designated output size, and the scaled image is repeatedly arranged to generate the output image.

The image processing apparatus 100 scans a document placed on a platen glass of the scanner unit 120 to acquire a scanned image. The image processing apparatus 100 performs image analysis processing on the acquired scanned image to perform detection of a document area, extraction of the document area, and inclination correction, thereby acquiring an inclination-corrected document image. The details of the document area detection processing will be described below.

The image processing apparatus 100 displays the inclination-corrected document image and a frame indicating a position of the repeat target area, based on the designated mode of the image repeat processing. Next, when receiving an instruction to determine the repeat target area from the user, the image processing apparatus 100 generates a repeat target image based on the inclination-corrected document image and the designated repeat target area. In generation of the repeat target image, the image processing apparatus 100 first extracts an image in an area designated as the repeat target area from the inclination-corrected document image, thereby generating an extracted image. In a case where the above-described non-scaling mode is designated as the output mode, the image processing apparatus 100 generates the repeat target image while maintaining the size of the extracted image in the non-scaled size. In a case where the above-described scaling mode is designated as the output mode, the image processing apparatus 100 generates the repeat target image by scaling the extracted image to the output size designated by the user. The program and a user interface (UI) used in the image processing apparatus 100 may be switched based on the output mode. The output mode may be switched in response to the instruction from the user, or may be switched based on a previously-registered predetermined program. Further, the output mode may be switched based on image information of the scanned image.

After the repeat target image is generated based on the output mode (non-scaling mode or scaling mode), the image processing apparatus 100 determines layout for repetitive arrangement of the repeat target image in the output image corresponding to the designated sheet size. Thereafter, the image processing apparatus 100 repeatedly arranges the repeat target image based on the determined layout, to generate an output image as a result of the image repeat processing, and displays a preview image on the UI of the display/operation unit. Further, an instruction to print the resultant image of the image repeat processing can be received from the user through the display/operation unit.

<Description of Flow>

Figure 3:
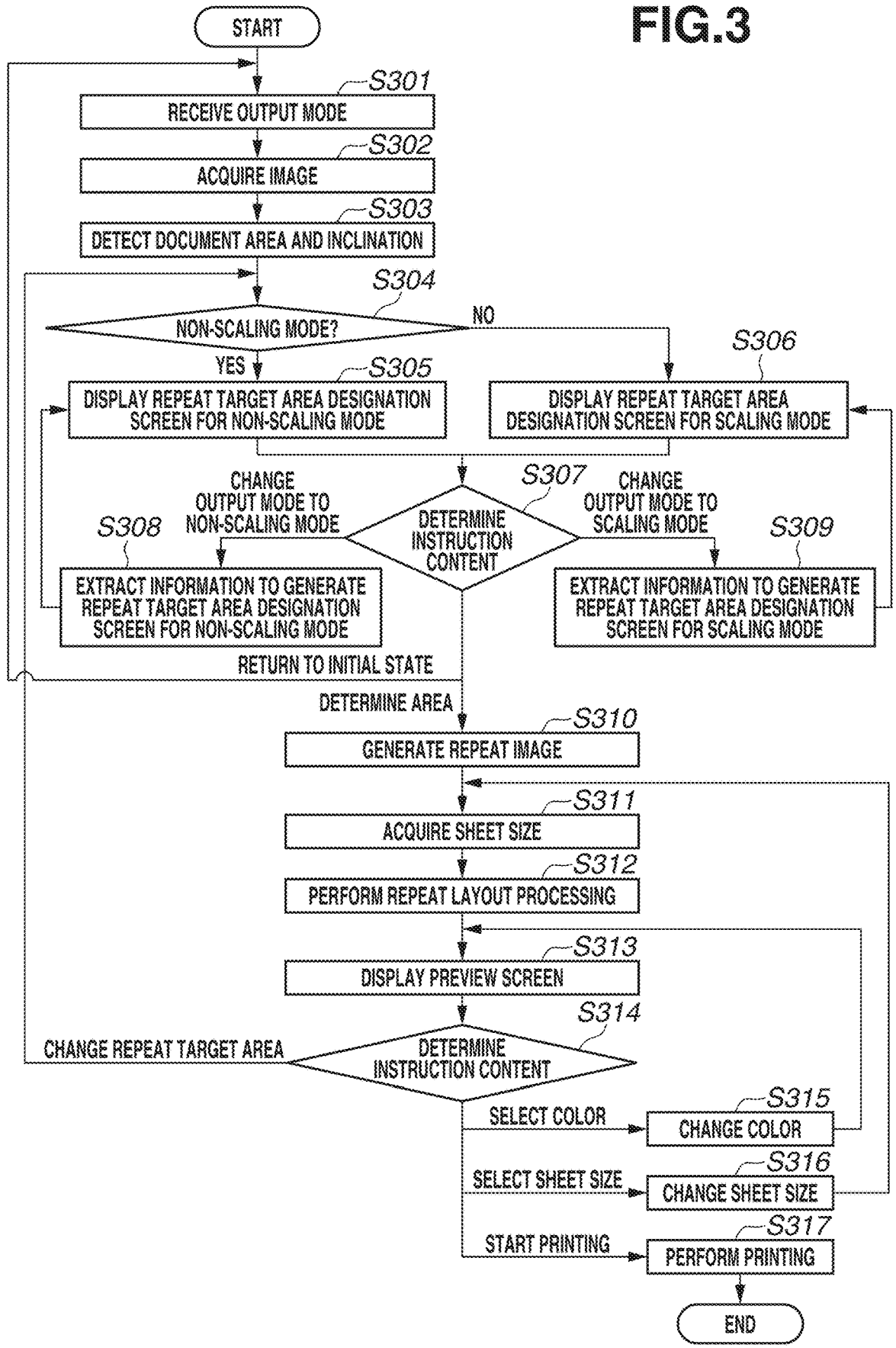
FIG. 3 is a flowchart relating to image repeat processing according to a first embodiment.
Figure 4:
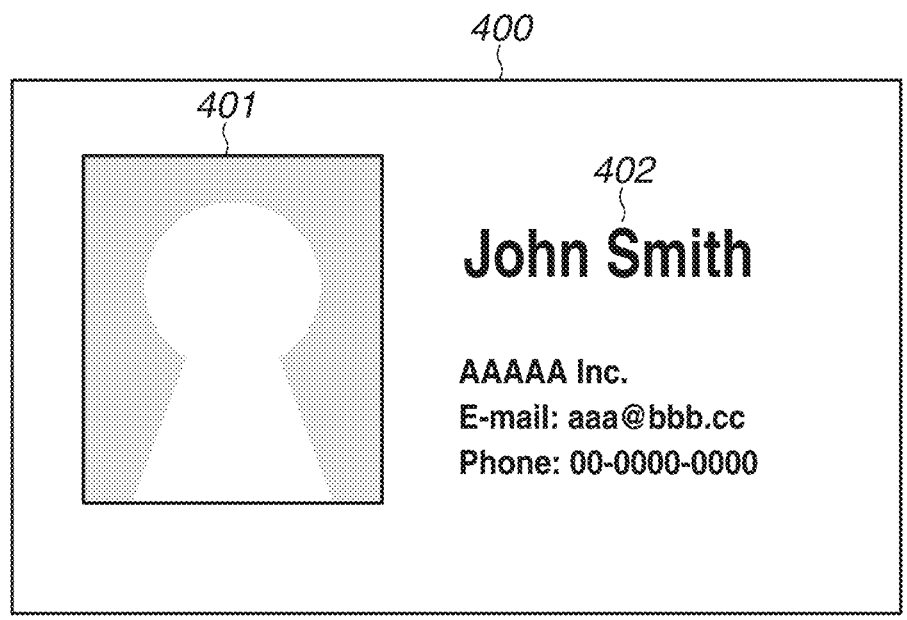
FIG. 4 is a diagram illustrating an example of a scan target document.

FIG. 3 is a flowchart illustrating details of the image repeat processing according to the first embodiment. The CPU 111 of the image processing apparatus 100 functions as a processing unit executing processing in each step of FIG. 3 by loading a processing program stored in the ROM 117 to the RAM 118 and executing the processing program. In the present embodiment, a case where a business card as illustrated in FIG. 4 is scanned as a scan target document is described; however, a type of the document is not limited to the business card, and may be, for example, a document with a regular size or an irregular size, a driver's license, a picture for certificate, various kinds of cards, and a postcard.

Figure 6:
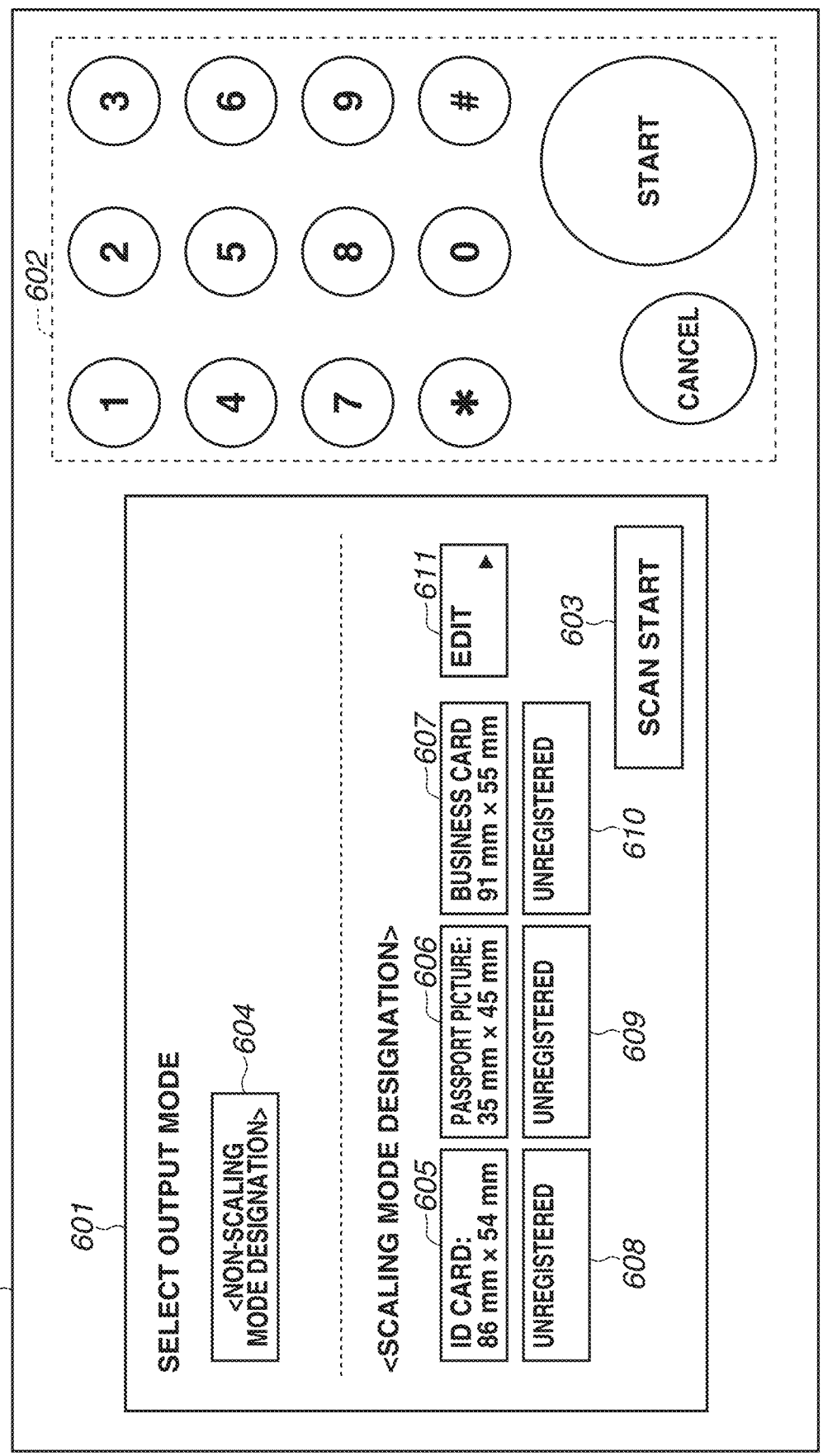
FIG. 6 is a diagram illustrating an example of an output mode selection screen.

When the image repeat processing is designated by the user on an operation screen of the image processing apparatus 100, the operation of the flowchart in FIG. 3 is started. After the flowchart is started, an operation screen is displayed in a touch panel display area 601 illustrated in FIG. 6. In FIG. 6, the display/operation unit 121 includes the touch panel display area 601 and hardware keys 602 (such as numerical keys and a start key for various kinds of processing). A message that prompts setting of a document on the platen glass and start of scanning, and a scan start button (software key) 603 to instruct start of scanning are displayed in the touch panel display area 601. Further, a non-scaling mode selection button 604 to select the non-scaling mode, scaling mode selection buttons 605 to 610 to select the scaling mode, and a scaling mode edit button 611 to edit the scaling mode selection buttons 605 to 610 are displayed. An output size and a button name are associated with each of the scaling mode selection buttons 605 to 610 one by one, and are displayed on the corresponding button. When the display of the screen is completed, the processing proceeds to step S301.

In step S301, the CPU 111 receives operation to select the output mode, operation to edit the scaling mode buttons, or operation to start scanning, from the user through the touch panel display area 601. At this time, in a case where any of the buttons 604 to 610 is pressed as the operation to select the output mode, the image processing apparatus 100 stores the pressed button as a selected button, and the CPU 111 switches the display of the selected button in the touch panel display area 601 to display in a selected state. When the non-scaling mode selection button 604 is pressed, the image processing apparatus 100 stores the non-scaling mode as the output mode. When any of the scaling mode selection buttons 605 to 610 is selected, the image processing apparatus 100 stores the scaling mode as the output mode, and stores the output size associated with the selected button as the output size to be used in generation of the repeat target image in the scaling mode. A print size of the extracted area is previously registered for each of the buttons 605 to 610 illustrated in FIG. 6, and the operation can be performed without designating the size every time. For example, the button 605 corresponding to an identification (ID) card with a size of 86 mm×54 mm indicates that the extracted image is enlarged or reduced so as to be printed in the size of 86 mm in a horizontal direction and 54 mm in a vertical direction. The button 606 corresponding to a picture for a passport with a size of 35 mm×45 mm indicates that the extracted image is enlarged or reduced so as to be printed in the size of 35 mm in a horizontal direction and 45 mm in a vertical direction. The button 607 corresponding to a business card with a size of 91 mm×55 mm indicates that the extracted image is enlarged or reduced so as to be printed in the size of 91 mm in a horizontal direction and 55 mm in a vertical direction. Further, each of unregistered buttons 608 to 610 are in a state where a button name and horizontal and vertical sizes of the extracted image in printing have not been registered yet, and can be registered thereto. The registration can be performed by pressing the scaling mode edit button 611 to display a software keyboard allowing input on the display for registration of the button name, and inputting the button name. In addition, the horizontal and vertical sizes of the extracted image in printing can be input through a software numeric keypad. As for a length of characters settable as a button name and the horizontal and vertical sizes of the extracted image in printing, a value range may be previously determined and a value out of the range may be determined as an error. The range of the length of the characters and the range of the value of the sizes are optionally settable. Further, the registered button name and the size of the extracted image in printing can be changed by the scaling mode edit button 611. After the setting is completed, the CPU 111 performs association by overwriting the existing output size and the existing name of the selected button with the received output size and the received name.

Then, when the scan start button 603 is selected by the user, the processing proceeds to step S302.

Figure 5:
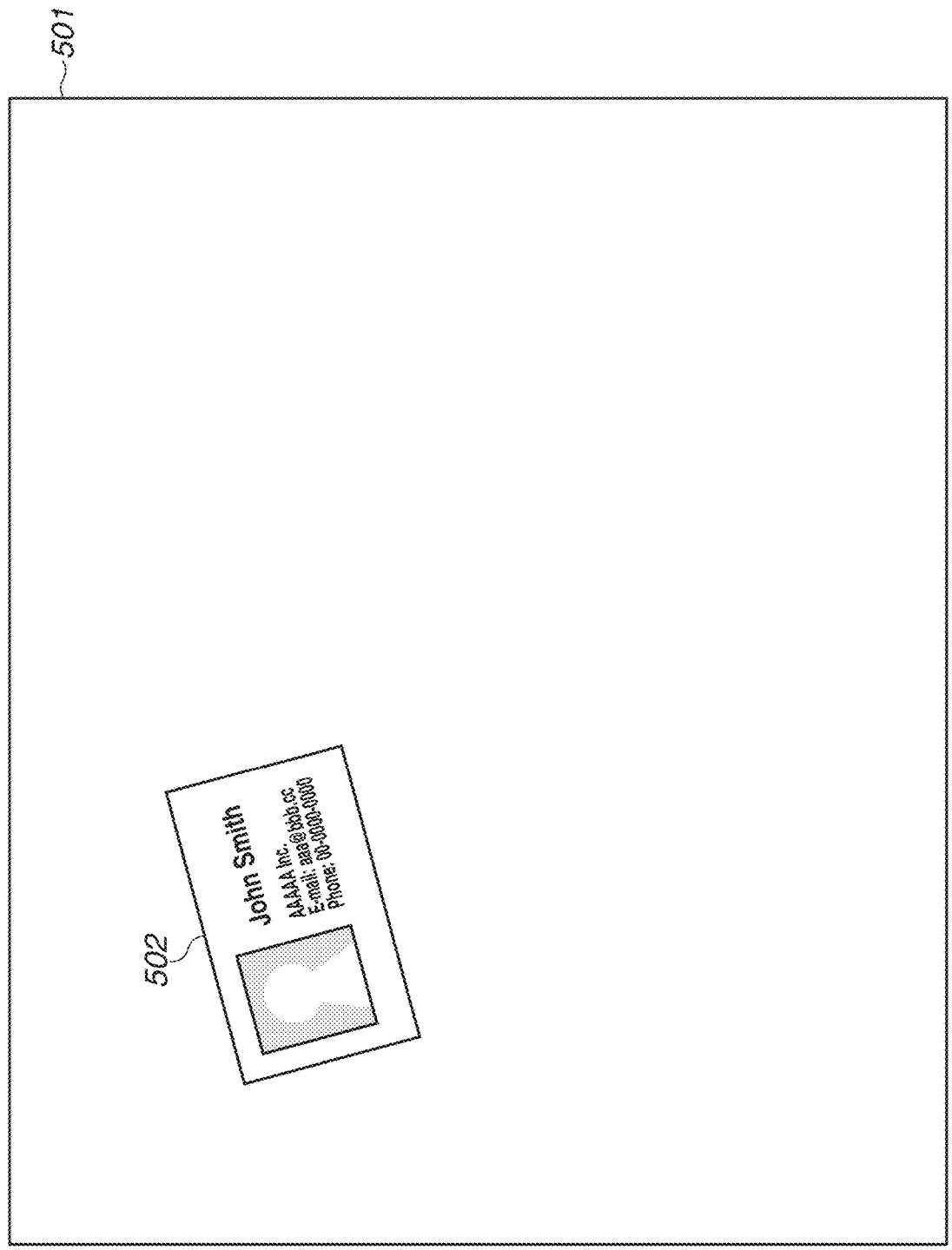
FIG. 5 is a diagram illustrating an example of an image that has the same size as a size of a platen glass, obtained as a result of reading the document placed on the platen glass.

In step S302, the CPU 111 operates the scanner unit 120 to acquire an image. At this time, in a case where the scanning is performed after a business card as illustrated in FIG. 4 or a document of an irregular size is placed on the platen glass, a document size detection sensor cannot automatically detect the document size in some cases. Thus, in the image repeat processing according to the present embodiment, the whole of the platen glass is set as a read target, and the scanned image of the same size as that of the platen glass is acquired. As a result, a scanned image 501 as illustrated in FIG. 5 is acquired. At this time, when the business card is casually placed on the platen glass without being aligned in horizontal and vertical directions as illustrated in FIG. 5, the business card is scanned in a state of inclining with respect to the platen glass. As a result, an inclined business card image 502 is included in the scanned image 501. After the scanned image 501 is acquired, the processing proceeds to step S303.

In step S303, the CPU 111 performs the image analysis processing (document area detection processing) on the scanned image acquired in step S302, to detect a document area and perform inclination detection processing. As a result, it is possible to detect an area of the business card image 502 included in the scanned image 501 acquired in step S302, and to acquire inclination information when the business card is placed. After the document area and the inclination information are acquired, the processing proceeds to step S304. The document area detection processing and the inclination detection processing described above can be achieved by known methods. As a method of detecting the document area from the scanned image, for example, a known method in which a Sobel filter is applied to the scanned image to acquire an edge intensity image, and a part where pixels with high intensity linearly continue is detected as an edge of the document, can be used. Further, four vertices are specified based on detected four edges of the document, and the document area is determined based on the specified four vertices. Further, to detect the inclination, for example, an inclination angle may be estimated based on the specified edges and coordinate values of the four vertices. If the document area is not detected from the scanned image 501, the CPU 111 may use a predetermined area previously described in the program as a detected document area. Alternatively, undetection of the document area may be displayed on the touch panel display area 601, and display prompting the user to perform scan operation again may be performed after the processing proceeds to step S301. In the embodiments, the operation when the document is not detected is not limited to those described above.

In step S304, the CPU 111 switches the processing corresponding to the output mode based on the output mode stored in step S301. In a case where the output mode is the non-scaling mode (YES in step S304), the processing proceeds to step S305. In a case where the output mode is the scaling mode (NO in step S304), the processing proceeds to step S306.

Figure 9:
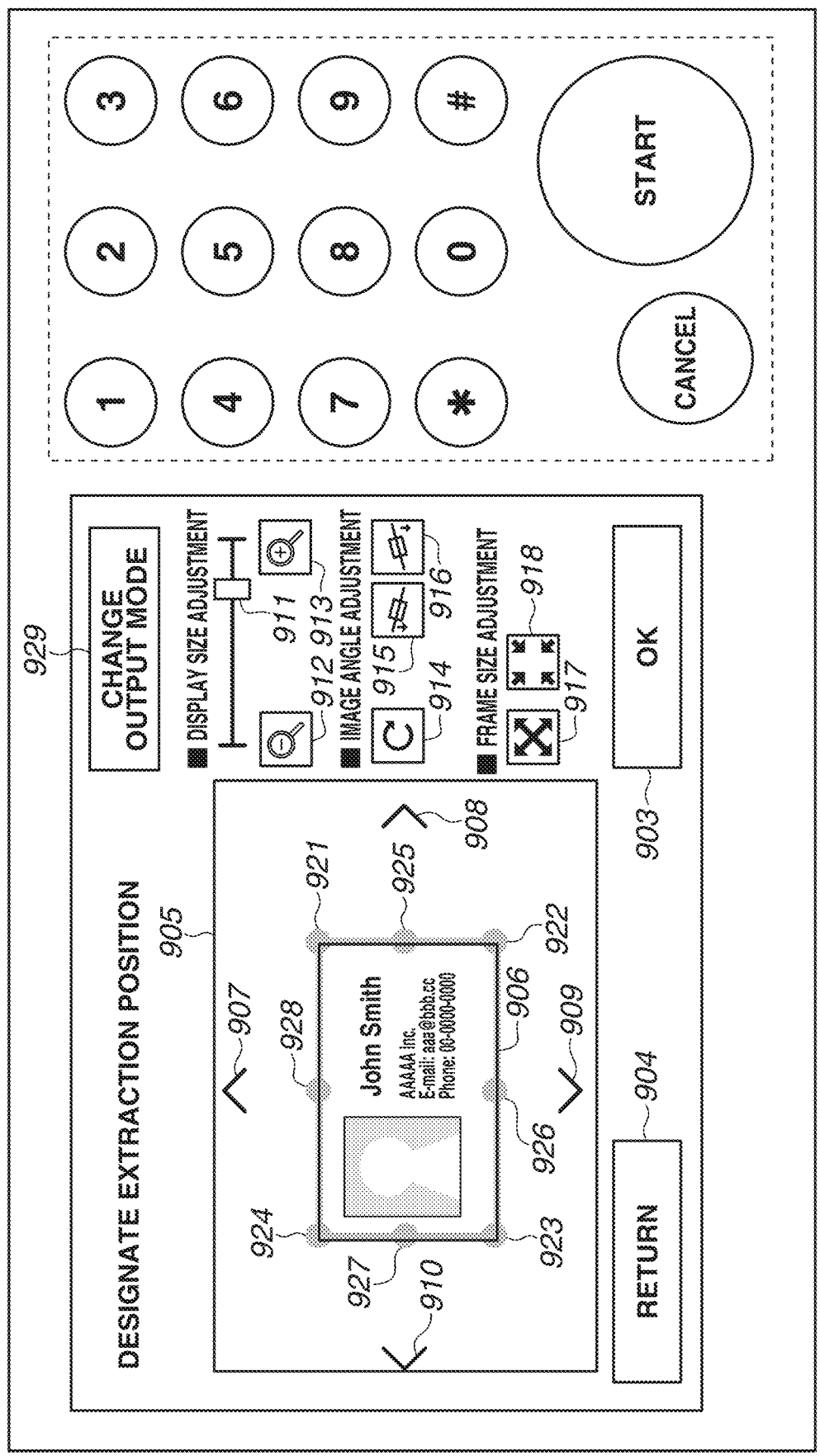
FIG. 9 is a diagram illustrating an example of default display of the repeat target area designation screen.

In step S305, the CPU 111 calculates an initial repeat target area for the non-scaling mode. Further, the CPU 111 generates a repeat target area designation screen as illustrated in FIG. 9 with use of the initial repeat target area. The initial repeat target area on the screen is generated with use of the document area and the inclination information acquired in step S303. At this time, the scanned image displayed on the screen is enlarged and displayed in a state of focusing on the document area, and an image rotation direction is set based on the inclination information so that the direction of the document is erected with respect to a direction of the touch panel display area 601. In other words, in initial display in step S305, the document area that has been detected in step S303 and subjected to the inclination correction is displayed, and an area of the inclination-corrected document image is designated and displayed as it is as the initial repeat target area. Accordingly, in a case where change of the repeat target area is not instructed by the user and the repeat target area is determined on the screen in the initial state, the inclination-corrected detected document area becomes the repeat target area as it is.

Details of the repeat target area designation screen illustrated in FIG. 9 will be described. A preview image of the scanned image acquired in step S302 is displayed in a display area 905 in FIG. 9. Further, a frame 906 that indicates a position of the repeat target area at that time is displayed to overlap the preview image. The frame 906 indicating the position of the repeat target area is desirably displayed with a line of an easily distinguishable color (e.g., red color). Handlers 921 to 924 in FIG. 9 are displayed at respective vertices of the frame 906. The user can reduce or enlarge the repeat target area by changing the positions of the vertices of the frame with use of the handlers. Handlers 925 to 928 are handlers used by the user to change positions of respective edges of the frame 906. The user can reduce or enlarge the repeat target area also by operating these handlers. When any of arrows 907 to 910 is pressed by the user, the displayed document part image is moved in a direction of the pressed arrow. In other words, the document part image is relatively moved by any of the arrows 907 to 910 without moving the position of the frame 906, which allows adjustment of the frame to an extraction position desired by the user. The movement of the document part image is not limited to by the operation of the arrows 907 to 910, and the document part image may be moved through touch and drag operation by the user at a position outside the frame 906 and inside the display area 905 of the preview image.

Figure 10:
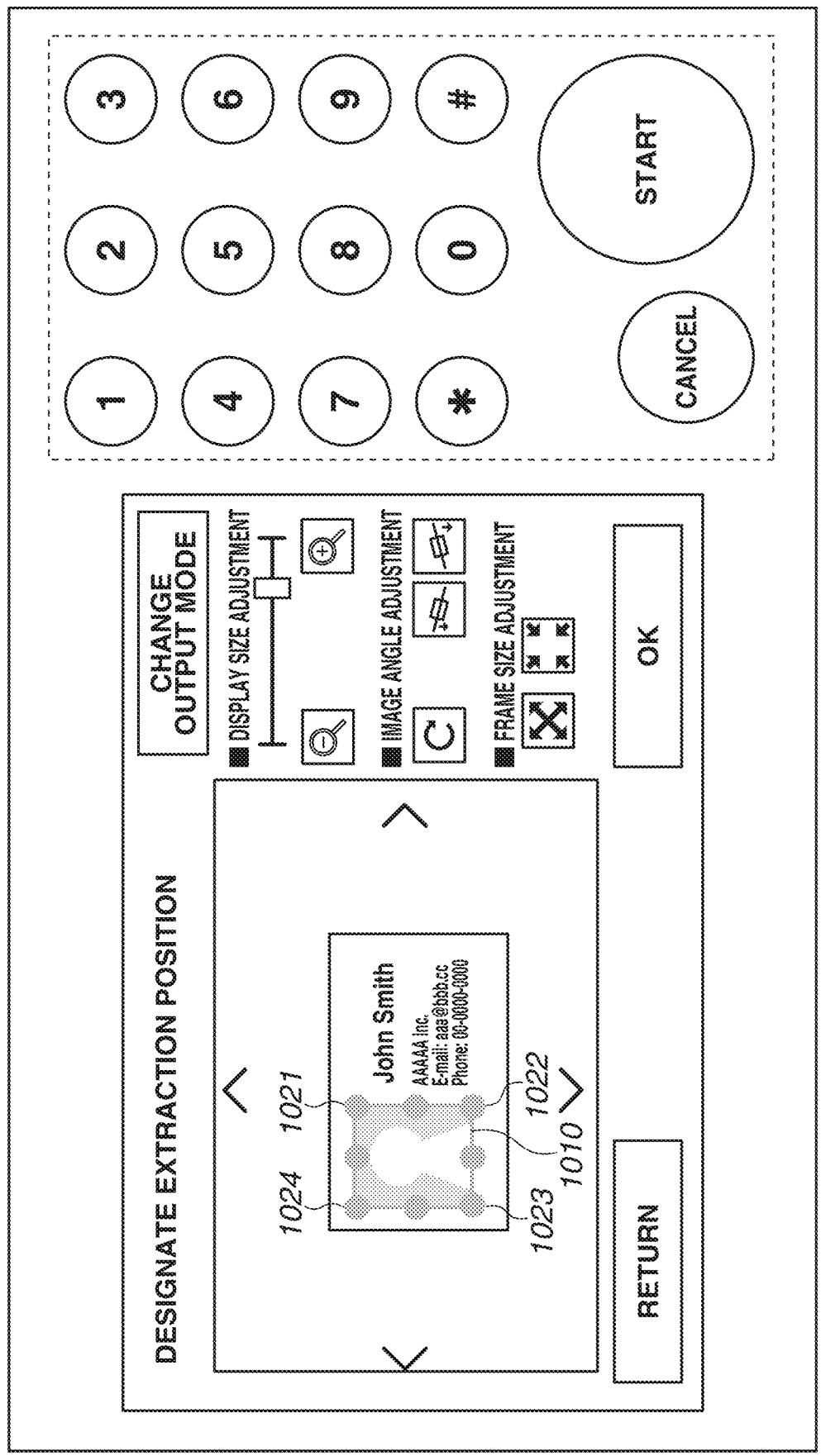
FIG. 10 is a diagram illustrating an example of a case where a position of a frame indicating a repeat target area is corrected in the repeat target area designation screen.

In designating the repeat target area in the non-scaling mode, for example, the user can operate the handlers 921 to 928 of the frame 906 indicating the repeat target area in FIG. 9, to designate an area corresponding to handlers 1021 to 1024 as illustrated in FIG. 10. In this case, the repeat target area is changed from the area of the frame 906 illustrated in FIG. 9 to an area of a frame 1010 illustrated in FIG. 10.

In the repeat target area designation screen of FIG. 9, the scanned image of the entire platen glass acquired in step S02 is not displayed, but the area based on the initial repeat target area generated from the document area and the inclination information acquired in step S303 is enlarged and displayed. If the scanned image of the entire platen glass is previewed as it is, the business card image included in the scanned image is displayed relatively small. As a result, it becomes difficult for the user to designate the area to be repeated as intended. Accordingly, in the present embodiment, the partial image detected as the document area in step S303 is displayed large initially, which makes it easy for the user to designate the area to be repeated. Further, since the document part image is displayed on the display so that the direction of the document is parallel to the touch panel display area 601, the user can accurately designate the area to be repeated. Further, even if the document is inclinedly placed on the platen glass and is scanned, the inclination is detected in step S302. Therefore, it is unnecessary for the user to take care not to inclinedly place the document when the user places the document on the platen glass.

A bar 911 in FIG. 9 indicates a state of a display magnification of the image displayed in the display area 905. The bar 911 located on the right side indicates that the image is enlarged and displayed, and the bar 911 located on the left side indicates that the image is reduced and displayed. When the user presses a button 912, the display magnification is reduced and the reduced image is displayed. When the user presses a button 913, the display magnification is increased and the enlarged image is displayed. The display magnification can also be changed through direct drag operation of the bar 911 in the horizontal direction. When the user presses a button 914, the display direction of the image displayed in the display area 905 is rotated by 90 degrees. When the user presses a button 915, the image displayed in the display area 905 is rotated by 0.5 degrees in a counterclockwise direction. When the user presses a button 916, the image displayed in the display area 905 is rotated by 0.5 degrees in a clockwise direction. In the present embodiment, the rotation angle step of each of the buttons 915 and 916 is 0.5 degrees; however, the rotation degree step is not limited to 0.5 degrees.

A button 917 in FIG. 9 is a button for an instruction to enlarge the frame 906 while maintaining an aspect ratio of the frame 906. When the user presses the button 917, each of the edges of the frame 906 is moved by a predetermined number of pixels. A button 918 is a button for an instruction to reduce the frame 906 while maintaining the aspect ratio of the frame 906. When the user presses the button 918, each of the edges of the frame 906 is moved by a predetermined number of pixels in a direction in which the frame 906 is reduced. The buttons for operating the frame 906 are not limited thereto. For example, four buttons including a button to enlarge the frame 906 in the vertical direction, a button to reduce the frame 906 in the vertical direction, a button to enlarge the frame 906 in the horizontal direction, and a button to reduce the frame 906 in the horizontal direction may be displayed. Further, these buttons may be displayed by being switched based on the output mode stored in step S301. For example, in the scaling mode in which the output size is designated by the user, if the aspect ratio of the repeat target area is different from the aspect ratio of the output size, the image extended in the horizontal direction or in the vertical direction is printed as a result of the image repeat processing, which is unintended by the user in some cases. Accordingly, in the case where the output mode is the scaling mode, only the buttons to enlarge or reduce the frame 906 while maintaining the aspect ratio as illustrated in FIG. 9 may be displayed.

When the user presses a button 904, the CPU 111 displays the output mode selection screen illustrated in FIG. 6, and the processing proceeds to step S301.

Figure 8:
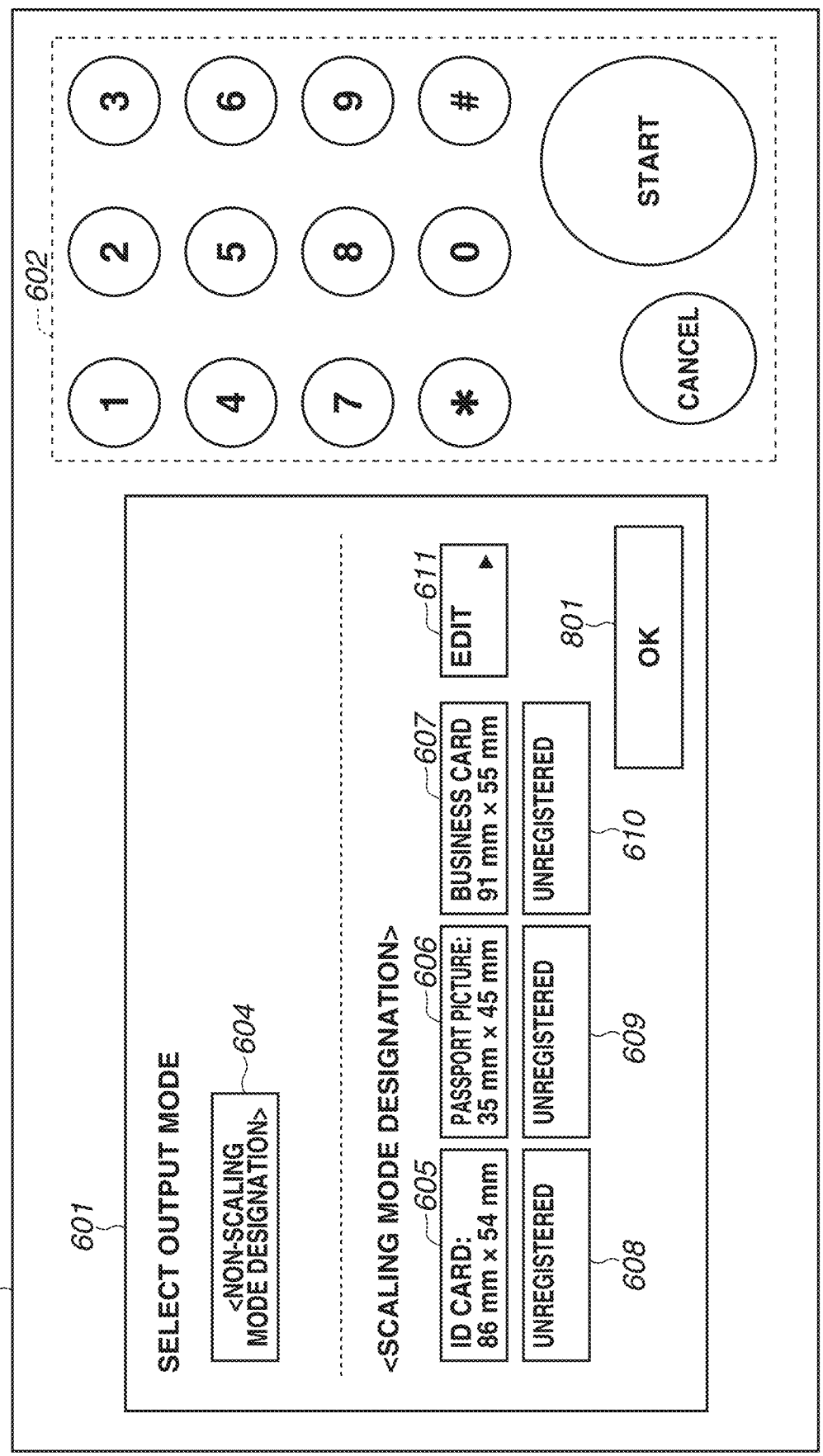
FIG. 8 is a diagram illustrating an example of the output mode selection screen displayed in a case where change of an output mode is selected in a repeat target area designation screen.

When the user presses an output mode change button 929, the CPU 111 displays an output mode change screen illustrated in FIG. 8 on the touch panel display area 601. A most part of the output mode change screen is the same as the output mode selection screen illustrated in FIG. 6. As difference, a button 801 to complete the output mode selection is displayed in place of the scan start button 603. The operations of other buttons are similar to the operations described in step S301. Thereafter, in a case where any of the buttons 604 to 607 of the output mode is selected in FIG. 8, the image processing apparatus 100 stores the selected output mode. When the output mode selection completion button 801 is selected, the CPU 111 performs mode change determination in step S307. In a case where it is determined that the output mode has been changed from the scaling mode to the non-scaling mode (CHANGE OUTPUT MODE TO NON-SCALING MODE in step S307), the processing proceeds to step S308. In a case where it is determined that the output mode has been changed from the non-sealing mode to the sealing mode (CHANGE OUTPUT MODE TO SCALING MODE in step S307), the processing proceeds to step S309.

When the user presses a button 903, the CPU 111 determines in step S307 that a button to determine the repeat target area has been pressed (DETERMINE AREA in step S307), and determines the repeat target area. After the CPU 111 determines the repeat target area, the processing proceeds to step S310.

Figure 16:
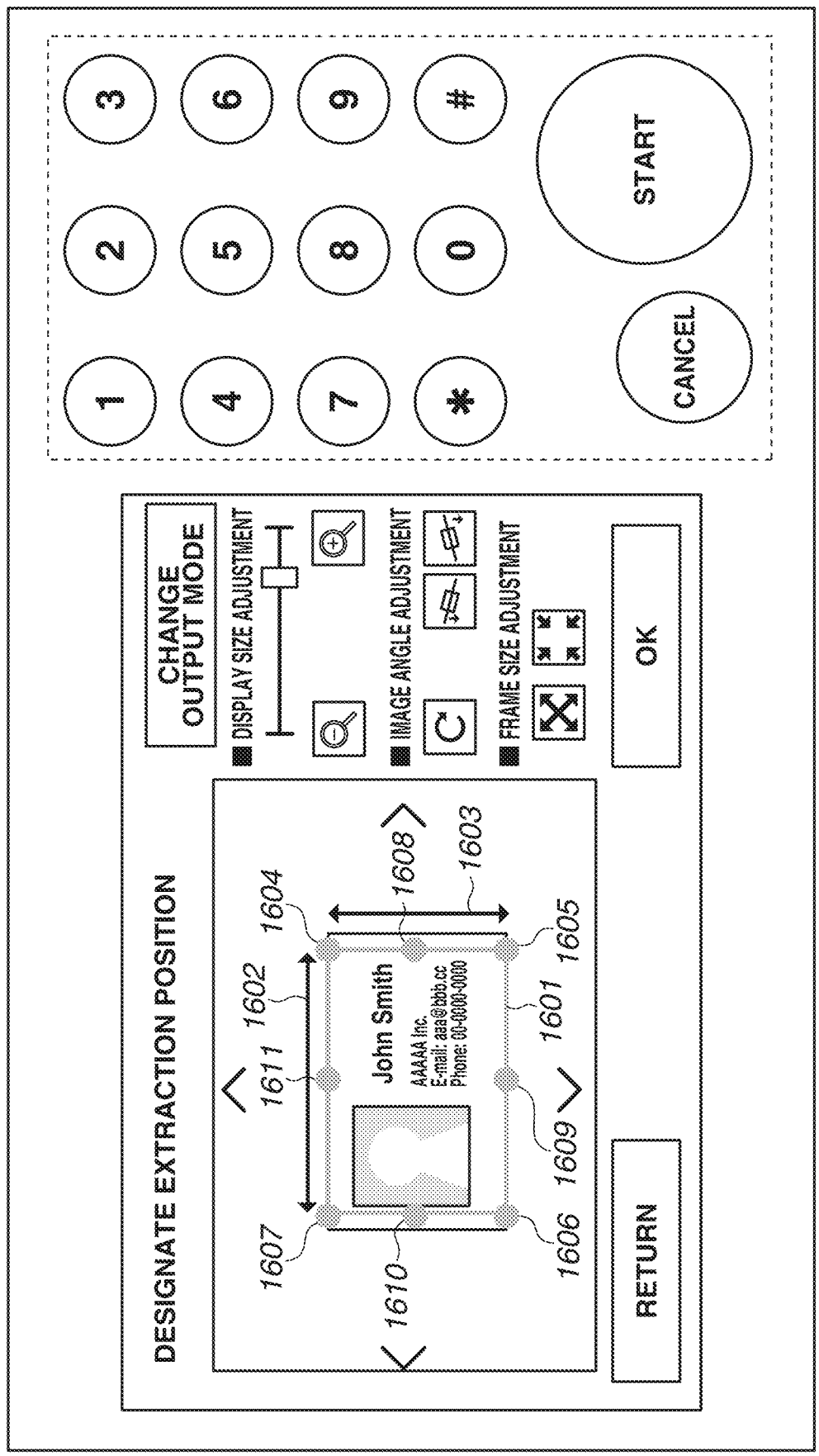
FIG. 16 is a diagram illustrating an example of the default display of the repeat target area designation screen in a scaling mode.

In step S306, the CPU 111 generates a repeat target area designation screen for scaling mode as illustrated in FIG. 16. The repeat target area designation screen for scaling mode in FIG. 16 is different from the repeat target area designation screen for non-scaling mode in FIG. 9 in display of the initial repeat target area (frame 1601 indicating the position of repeat target area). The initial repeat target area on this screen uses the document area and the inclination information acquired in step S303. In other words, the scanned image displayed on the screen is enlarged and displayed while focusing on the document area, and the image rotation direction is set based on the inclination information so that the document is erected with respect to the touch panel display area 601. Further, the initial repeat target area is determined based on the document area acquired in step S303 and the information on the output size stored in step S301. The determination method at this time is different from the determination method in the case of the non-scaling mode described in step S305. First, the center position of the repeat target area is determined so as to overlap the center position of the inclination-corrected document area. Next, a rectangle that has the same aspect ratio as the aspect ratio of the output size stored in step S301 and has the maximum size inside the inclination-corrected document area, is formed, and the formed rectangle is displayed as the initial repeat target area with the determined center position as a reference position. In a case where the width of the document image is large as illustrated in FIG. 16, a width 1602 and a height 1603 of the frame 1601 indicating the position of the initial repeat target area are adjusted so that the rectangle has the same aspect ratio as the aspect ratio of the output size designated in step S301 and the width 1602 of the frame 1601 is coincident with a height of the document image. On the other hand, in a case where the width of the document image is small, the adjustment is performed so that the width 1602 of the frame 1601 is coincident with the width of the document image. When the user satisfies the initially-displayed frame indicating the position of the repeat target area, the user can determine the frame as the repeat target area.

Figure 17:
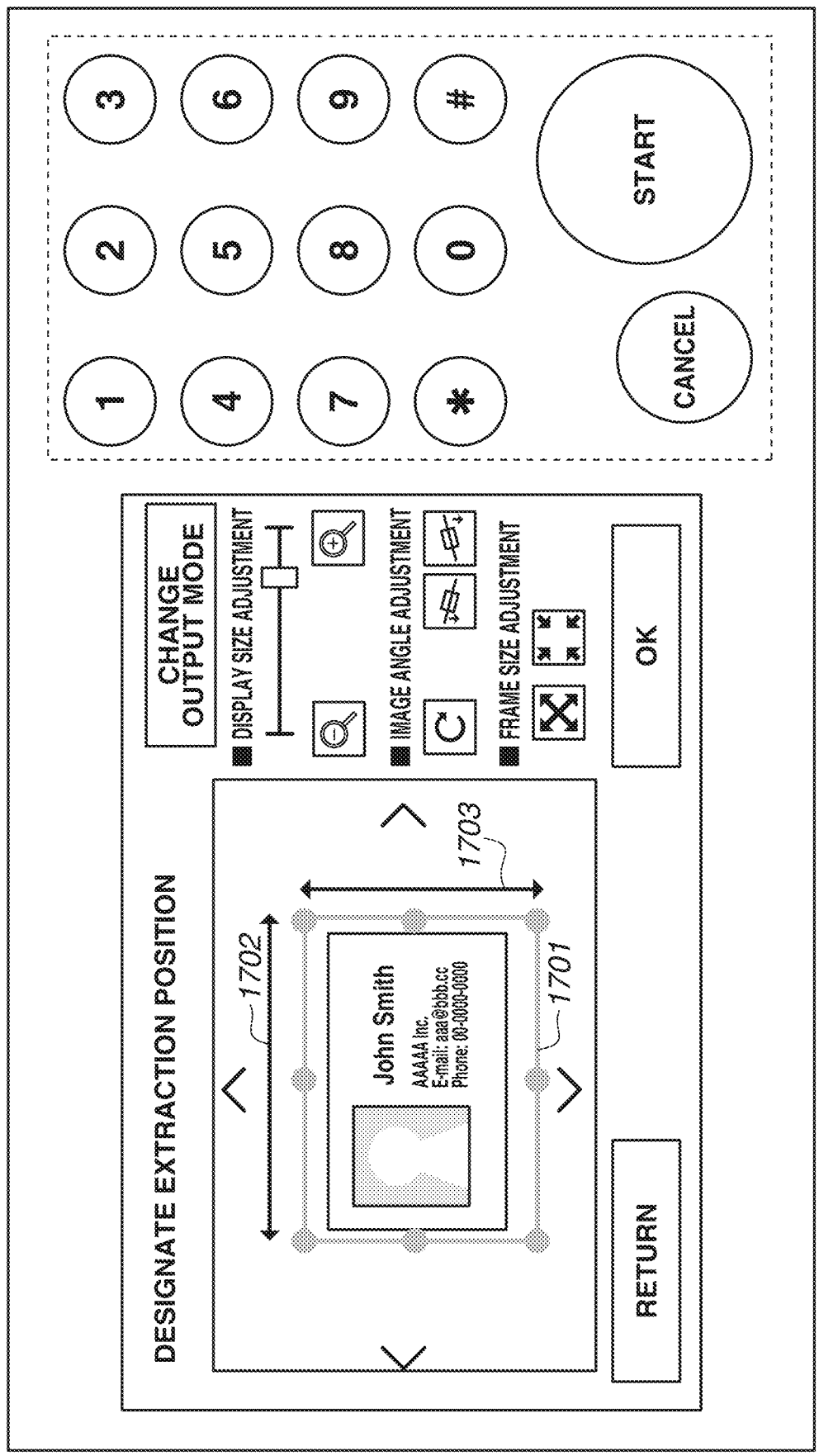
FIG. 17 is a diagram illustrating an example of a case where the position of the frame indicating the repeat target area is corrected in the repeat target area designation screen in the scaling mode.

Further, the user can also correct the position of the initial repeat target area on the operation screen illustrated in FIG. 16. For example, in a case where the user wants to designate the repeat target area so as to include the whole of the document area included in the scanned image, the user can enlarge the designated area by operation handlers 1604 to 1611 illustrated in FIG. 16 to change the repeat target area on the operation screen. FIG. 17 illustrates a screen after the operation to enlarge the designated area is performed. FIG. 17 illustrates the screen in which the initial repeat target area illustrated in FIG. 16 is designated again so as to include the whole of the document area. At this time, a width 1702 and a height 1703 of a frame 1701 indicating the repeat target area are enlarged as illustrated in FIG. 17. The aspect ratio of the width 1702 and the height 1703 of the frame 1701 indicating the repeat target area in FIG. 17 is coincident with the aspect ratio of the output size designated in step S301 (aspect ratio of frame 1601 in FIG. 16). In other words, in the case e the repeat target area is enlarged or reduced, the enlargement or the reduction is performed while maintaining the aspect ratio of the output size designated in step S301. As a result, the aspect ratio of the frame 1701 indicating the repeat target area in FIG. 17 is coincident with the aspect ratio of the output size designated in step S301. Description of the details of the other user interfaces in the repeat target area designation screen in FIG. 16 is omitted because the other user interfaces are similar to those in FIG. 9.

In the case where it is determined in step S307 that the output mode has been changed from the scaling mode to the non-scaling mode (CHANGE OUTPUT MODE TO NON-SCALING MODE in step S307), the processing proceeds to step S308. In step S308, information required to generate the repeat target area designation screen for non-scaling mode is extracted. The information extraction performed at this time indicates extraction of information to convert the operation contents operated by the user in the screen displayed when the scaling mode is designated, into operation contents for non-scaling mode. In this example, extraction is performed in order to use the information on the frame of the repeat target area designated in the repeat target area designation screen for scaling mode as it is as information on the frame of the repeat target area for non-scaling mode. The document area acquired in step S303 is replaced with the repeat target area acquired at this time, and the processing proceeds to step S305. In other words, the initial repeat target area displayed in step S305 is the same as the repeat target area that has been designated in the repeat target area designation screen for scaling mode before the mode is changed.

In the case where it is determined in step S307 that the output mode has been changed from the non-scaling mode to the scaling mode (CHANGE OUTPUT MODE TO SCALING MODE in step S307), the processing proceeds to step S309. In step S309, information to generate the repeat target area designation screen for scaling mode is extracted. The information extraction performed at this time indicates extraction of information to convert the operation contents operated by the user in the screen displayed when the non-scaling mode is designated, into operation contents for scaling mode. In this example, the center position is calculated from the repeat target area designated in the repeat target area designation screen for non-scaling mode. The center position of the document area acquired in step S303 is replaced with the center position acquired at this time, and the processing proceeds to step S306. In other words, the initial repeat target area displayed in step S306 is a rectangle area that has a center position overlapping the center position of the repeat target area designated in the repeat target area designation screen for non-scaling mode before the mode changed, and has the same aspect ratio as the aspect ratio of the output size designated in the scaling mode with the center position as the center of the rectangle.

In the case where it is determined in step S307 that determination of the repeat target area has been instructed (DETERMINE AREA in step S307), the processing proceeds to step S310. In step S310, the CPU 111 generates the repeat target image based on the determined repeat target area. The repeat target image generation method at this time is based on the output mode determined in step S301, S305, or step S306. More specifically, in the case where the output mode is the non-scaling mode, the size of the repeat target age is the same as the non-scaled size of the repeat target area. Thus, the document image illustrated in the repeat target area is extracted as it is to generate the repeat target image. On the other hand, in the case where the output mode is the scaling mode, a scaling factor is automatically calculated so that the size of the repeat target image becomes the previously-designated output size, and the image in the repeat target area is scaled based on the calculated scaling factor to generate the repeat target image. The scaling factor is calculated from the number of horizontal pixels and the number of vertical pixels of the image, information on resolution, and information on resolution of the image to be printed that are acquired in step S302, and the size designated in step S305. The scaling is performed with use of a known hi-cubic method or other methods. After the repeat target image is generated, the processing proceeds to step S311.

In step S311, the CPU 111 acquires information on the sheet size of the designated output sheet. In a case where the sheet size is not designated by the user, information on a default sheet size (e.g., A4 size) is acquired. For example, in a case where use of sheets in a manual feeding tray is previously designated, the user may designate the sheet size at this time. After the sheet size is acquired, the processing proceeds to step S312.

In step S312, the CPU 111 performs the repeat layout processing to determine positions where the repeat target image is repeatedly laid out in the output sheet, based on the size of the repeat target image and the information on the sheet size acquired in step S311. In the repeat layout processing, the arrangeable number of images when the repeat target image is arranged from upper left of the output sheet is calculated based on the horizontal and vertical sizes of the output sheet and the size of the repeat target image. Next, the arrangeable number of images when the repeat target image is rotated by 90 degrees and is arranged from the upper left of the output sheet is calculated. Then, the arrangeable number of images without rotation by 90 degrees and the arrangeable number of images with rotation by 90 degrees are compared. The repeat target image is repeatedly laid out using the layout with the larger arrangeable number of images, to generate a repeat-processed image (i.e., output image to be used in print processing). In a case where the arrangeable number of images without rotation by 90 degrees and the arrangeable number of images with rotation by 90 degrees are equal to each other, the output image is generated by using the layout without rotation of the repeat target image. After the output image is generated, the processing proceeds to step S313.

Figure 7:
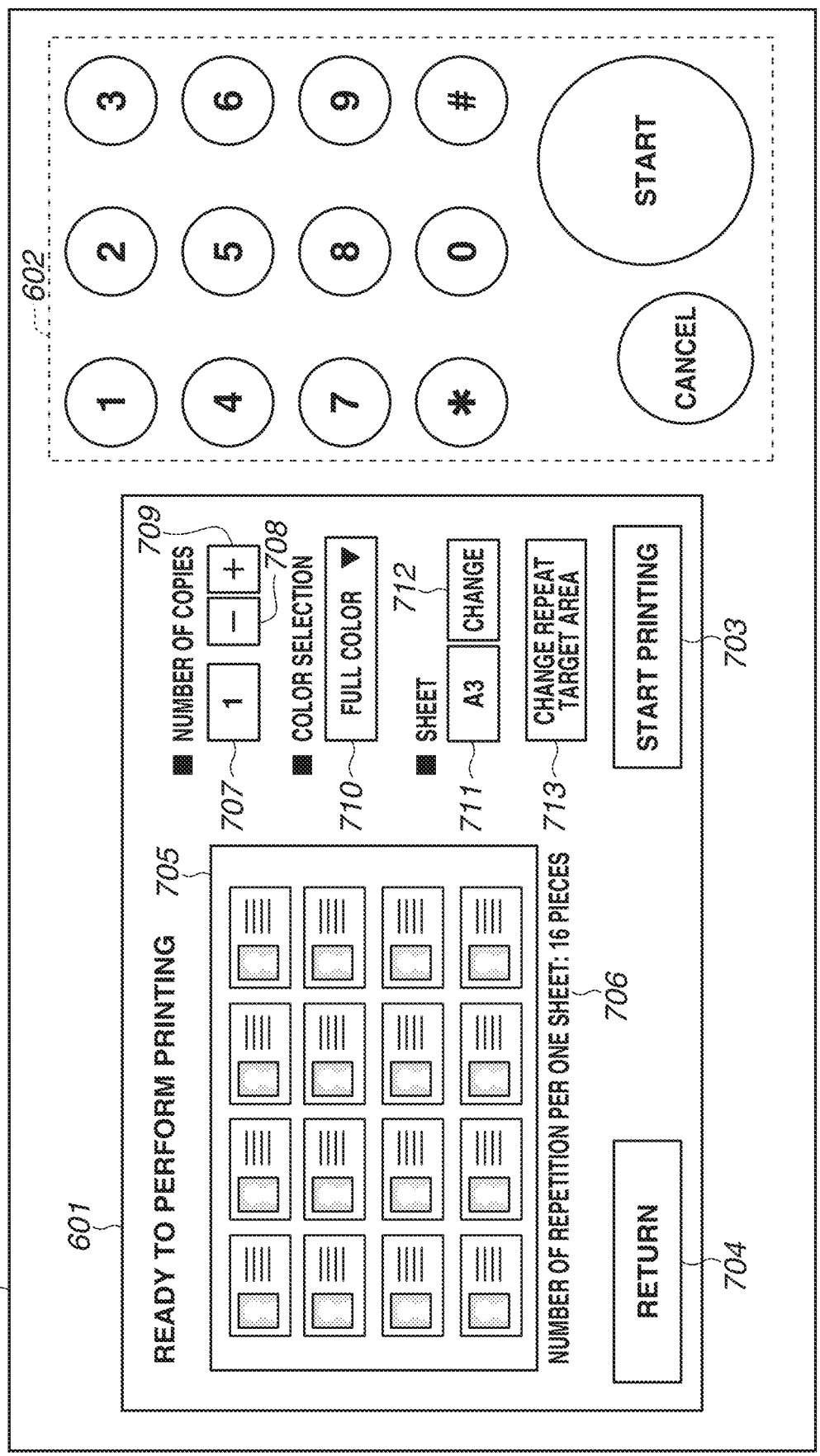
FIG. 7 is a diagram illustrating an example of a preview screen that is used to preview an image obtained through execution of image repeat layout processing.

In step S313, the CPU 111 generates a preview image of the output image generated in step S312, and displays the preview image on a preview screen of the display/operation unit 121. The preview screen displayed on the display/operation unit 121 is described with reference to FIG. 7. In FIG. 7, the display contents displayed in the touch panel display area 601 in FIG. 6 are changed to the preview screen of the output image.

A preview image 705 of the output image generated in step S308 is displayed in FIG. 7. Further, number information 706 indicates the number of repeat target images laid out in the output image generated in step S312. In the example of FIG. 7, the repeat target image is repeated by 16 times in one output image.

A number of printed sheets 707 indicates the number of printed sheets of the output image. When the user presses a plus button 709, the number of printed sheets is increased. When the user presses a minus button 708, the number of printed sheets is decreased. The number of printed sheets 707 may be increased or decreased by one sheet every time the plus button or the minus button is clicked, or may be continuously changed while the plus button or the minus button is kept pressing. Alternatively, the number of printed sheets 707 may be input by hardware keys 602.

A pulldown menu 710 allows the user to select whether to print the output image in color or monochrome. In the default setting, "full color" is automatically selected in a case of a color repeat target image, and "monochrome" is automatically selected in a case of a monochrome repeat target image. The user can change the setting of full-color printing/monochrome printing through manual operation with use of the color selection pulldown menu 710. As described below in step S315, when the setting of the full-color printing/monochrome printing is changed, the preview image 705 is also changed based on the changed setting. For example, when the user changes the setting to the monochrome printing in a state where the full-color printing is automatically selected, the preview image 705 is also changed to a monochrome preview image in conjunction therewith.

A sheet size 711 indicates a currently-designated sheet size. When the user presses a change button 712, sheet size change processing is performed as described below in step S316. When the sheet size is changed, the repeat layout processing in step S312 is executed to regenerate the output image based on the changed sheet size and the size of the repeat target image, and the preview image 705 of the output image and the number information 706 are updated.

When a repeat target area change button 713 is pressed by the user, the repeat target area designation screen illustrated in FIG. 9 is displayed, and the user can correct the current repeat target area to an area with a desired size at a desired position.

When a print start button 703 is pressed by the user, print processing is started based on the currently set contents as described below in step S317.

When a return button 704 is pressed by the user, the processing proceeds to step S301, and the screen is returned to the screen of FIG. 6.

In step S314, the CPU 111 determines whether any of the buttons and the pulldown menu displayed in the preview screen in FIG. 7 has been operated by the user. In a case where it is determined that the color selection pulldown menu 710 has been operated (SELECT COLOR in step S314), the processing proceeds to step S315. In a case where it is determined that the repeat target area change button 713 has been operated (CHANGE REPEAT TARGET AREA in step S314), the processing proceeds to step S304. In a case where it is determined that the sheet size change button 712 has been operated (SELECT SHEET SIZE in step S314), the processing proceeds to step S316. In a case where it is determined that the print start button 703 has been operated (START PRINTING in step S314), the processing proceeds to step S317.

In the case where it is determined in step S314 that the contents instructed by the user is change of full-color/monochrome setting in the color selection pulldown menu 710 (SELECT COLOR in step S314), the processing proceeds to step S315. In step S315, the CPU 111 updates the display of the pulldown menu 710 based on the changed setting. Then, the processing returns to step S313, and the CPU 111 also updates the preview image 705 based on the changed setting. For example, in a case where the full-color printing has been set and is changed to the monochrome printing in the pulldown menu 710, the monochrome preview image is generated and the display of the preview screen is updated in step S313. The monochrome preview image and the output image may be generated at a timing other than the timing at which the setting is changed to the monochrome printing in the pulldown menu 710.

Figure 11:
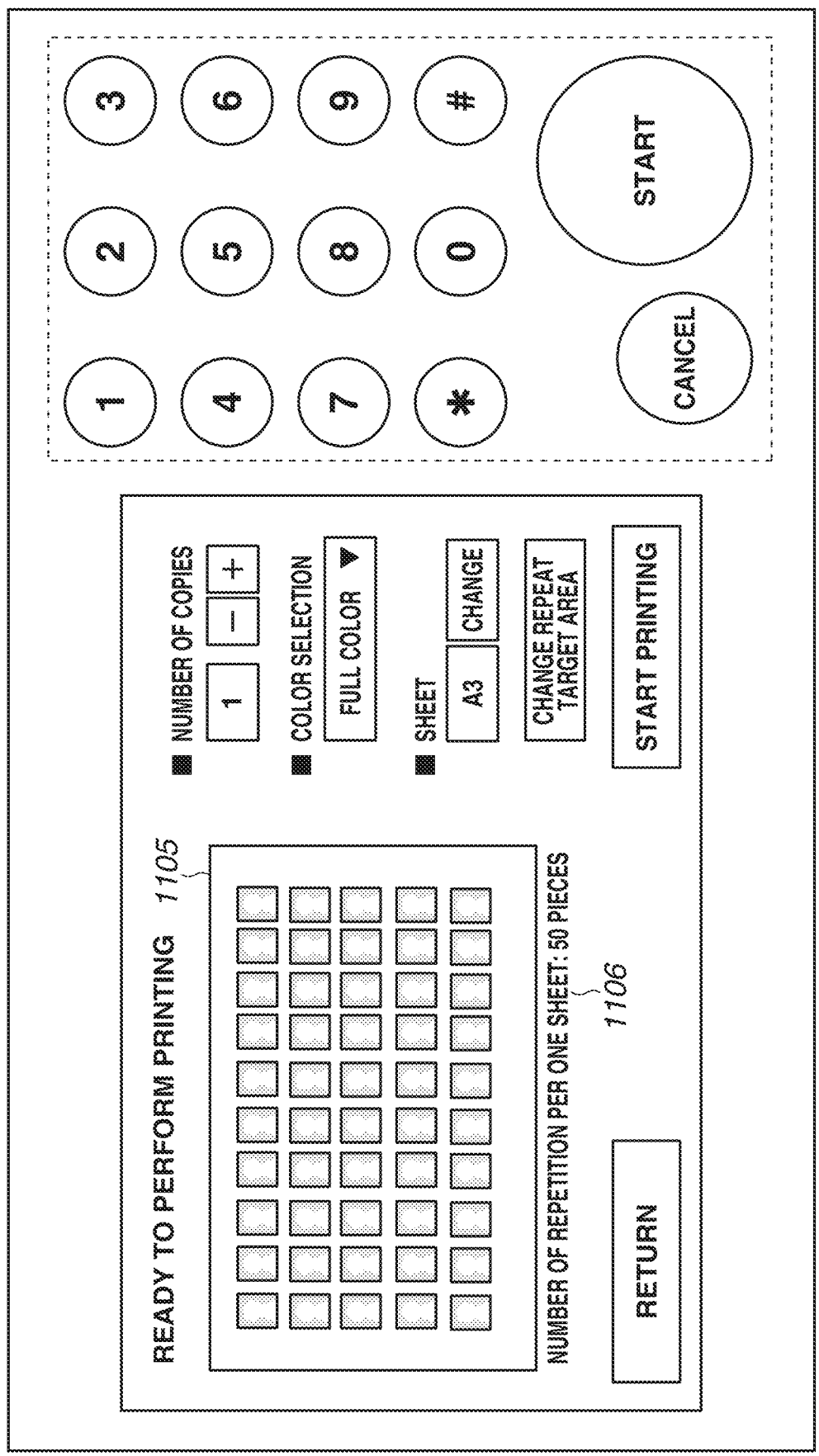
FIG. 11 is a diagram illustrating an example of a preview screen used to preview an image that is obtained through execution of the image repeat layout processing after the position of the frame indicating the repeat target area is corrected.
Figure 12:
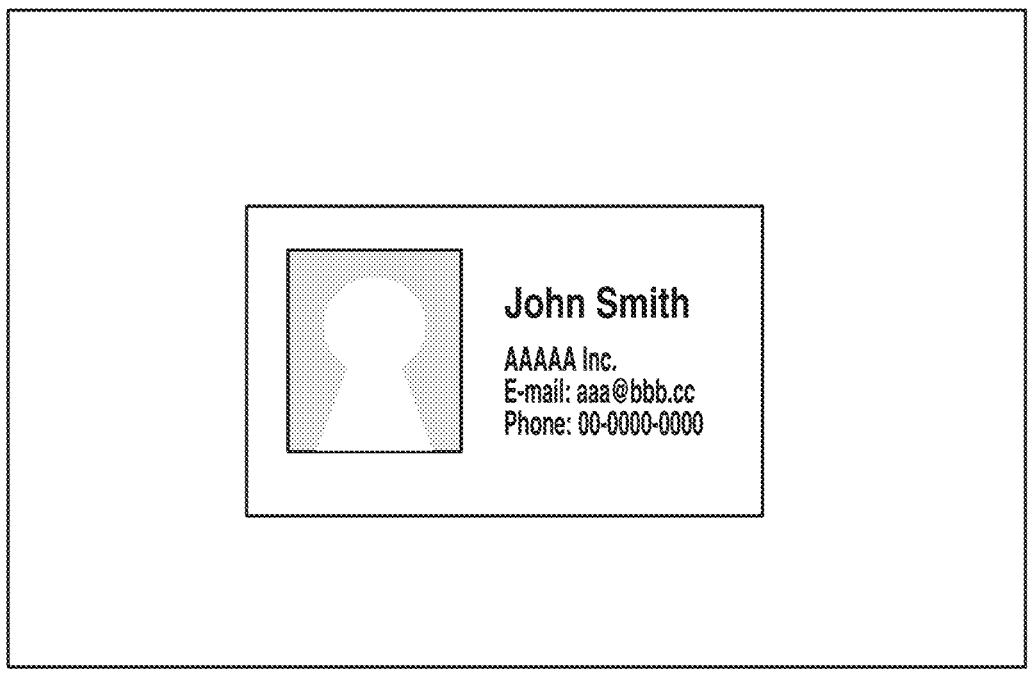
FIG. 12 is a diagram illustrating a document used in a second embodiment.

In the case where it is determined in step S314 that the operation by the user is pressing of the repeat target area change button 713 (CHANGE REPEAT TARGET AREA in step S314), the CPU 111 displays the repeat target area designation screen to change the repeat target area, on the touch panel display area 601, and the processing proceeds to step S304. The contents displayed on the display are determined by the CPU 111 based on the current output mode, and are switched. The repeat target area designation screen for non-scaling mode in FIG. 9 is described as an example. For example, it is assumed that, regarding change of the image of the repeat target area, the user wants to set only a picture area included in the business card image (document image), as the repeat target area. In this case, the user changes the positions of the vertex handlers 921 to 924 of the frame in FIG. 9 to the positions of the vertex handlers 1021 to 1024 of the frame in FIG. 10, respectively. When an OK button is pressed by the user in that state, the area surrounded by the frame in FIG. 10 is determined as the repeat target area, and the repeat target image is generated from the determined repeat target area in step S310. Further, in step S312, the repeat layout processing is executed again with use of the repeat target image. In step S313, the preview image of the Output image acquired through the repeat layout processing in step S312 is displayed on a preview screen 1105 as illustrated in FIG. 11. Number information 1106 in FIG. 11 indicates the number of layouts of the image in the repeat target area changed in FIG. 10. The operation and the flow described above are also applied to FIG. 16 that illustrates the repeat target area designation screen for scaling mode.

In the case where it is determined in step S314 that the operation by the user is pressing of the sheet size change button 712 (CHANGE SHEET SIZE in step S314), the processing proceeds to step S316. In step S316, a plurality of sheet size candidates (e.g., regular sizes A4, A3, B4, and B5) is presented, and the sheet size designated by the user from among the candidates is determined. The change of the sheet size is not limited to the selection from among the regular sizes, and an irregular sheet size (vertical and horizontal sizes of sheet) may be manually input by the user. After the sheet size is changed in step S316, the processing proceeds to step S311.

In the case where it is determined in step S314 that the operation by the user is pressing of the print start button 703 (START PRINTING in step S314), the processing proceeds to step S317. In step S317, the CPU 111 controls the printer unit 123 to perform printing of the output image generated in step S312.

The user can acquire a printed sheet in which the document placed on the platen glass is repeated, in the above-described manner. At this time, in a case where the initial repeat target area displayed in step S305 and step S306 is coincident with the area intended by the user, it is unnecessary for the user to select the repeat target area, and the printing can be executed through simple operation. On the other hand, in a case where the initial repeat target area displayed in step S305 and step S306 is not coincident with the area intended by the user, the user can perform detailed position alignment using the touch panel display area 601. Further, if the output mode is changed on the way, the operation up to immediately before the mode change is reflected on the initial display after the mode change. Therefore, the user can designate a target area through simple operation as compared with the initial display generated with use of the information detected in step S303.

Figure 13:
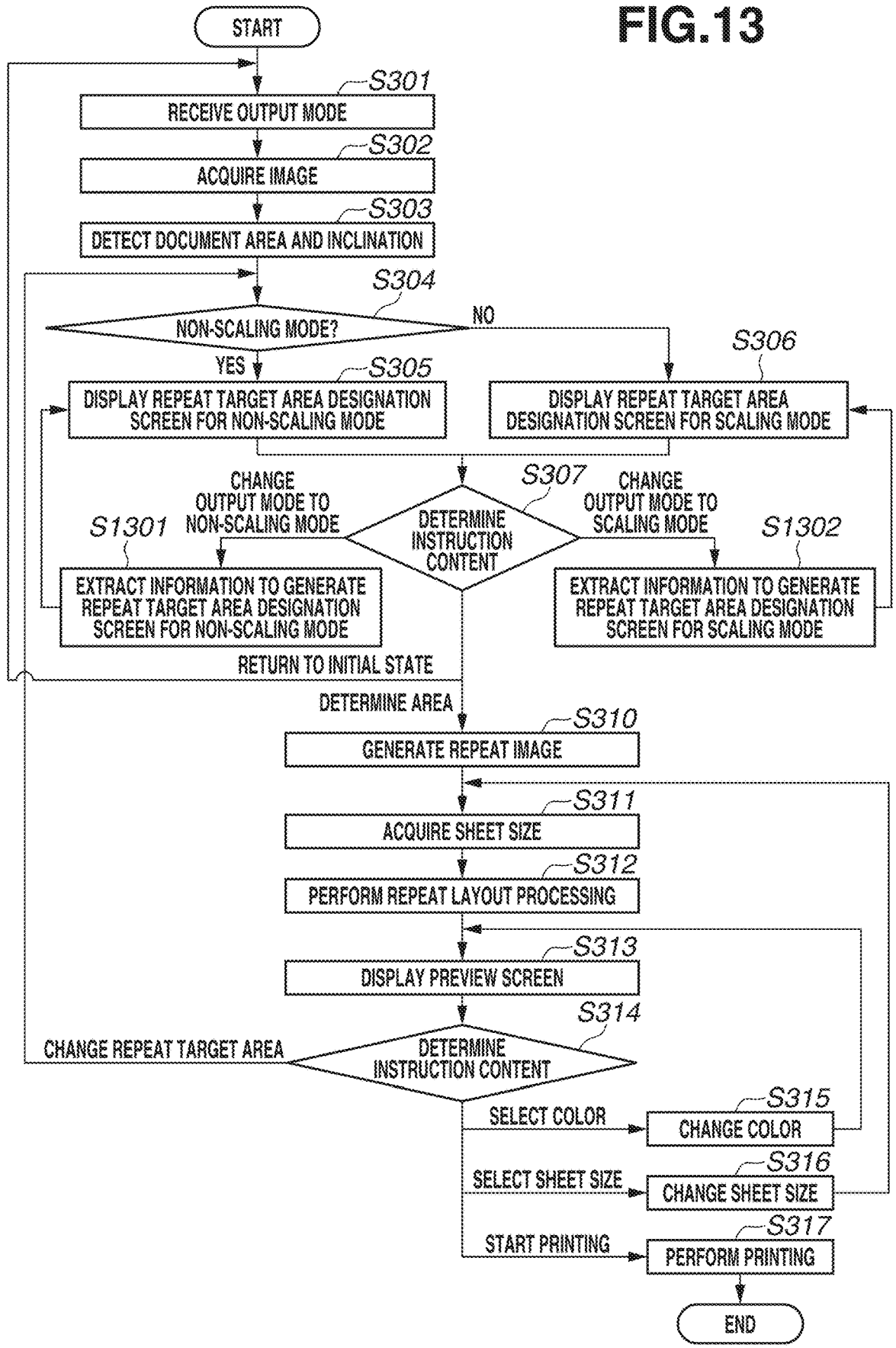
FIG. 13 is a flowchart relating to image repeat processing according to the second embodiment.

In the first embodiment, the case where, when the output mode is changed by the user on the repeat target area designation screen in FIG. 9 or FIG. 16, a part of the previous operation is reflected on the initial display after the mode change has been described. In a second embodiment, a case of focusing on the user operation in the method of reflecting the operation information when the output mode is changed in the flow according to the first embodiment is described. FIG. 13 is a flowchart of the second embodiment. The flowchart illustrated in FIG. 13 is changed in the operation performed when the output mode is changed in the flowchart illustrated in FIG. 3, and the other operations are similar to the operations in FIG. 3. In the following description, difference between the flowchart illustrated in FIG. 13 according to the second embodiment and the flowchart illustrated in FIG. 3 according to the first embodiment is described.

<Description of Flow>

In the second embodiment, in the case where the output mode is changed from the scaling mode to the non-scaling mode in step S307 illustrated in FIG. 13 (CHANGE OUTPUT MODE TO NON-SCALING MODE in step S307), the processing proceeds to step S1301.

In step S1301, the CPU 111 extracts information used to generate the initial repeat target area designation screen for non-scaling mode in step S305 focusing on the area operation performed by the user in step S306. In other words, the area operation performed by the user in step S306 is operation relating to image movement, image rotation, a display enlargement factor, and the repeat target area designation frame. Among the operation contents, attention is paid to the operation contents that are to be performed in step S306 and changed from the initial repeat target area designation screen.

In a case where operation relating to image movement, image rotation, or the display enlargement factor is performed among the operation contents, possibility that the operation is performed so as to display the target area intended by the user, in the user operation to designate the repeat target area designation in the scaling mode, is high. Therefore, the CPU 111 determines that the area to be initially displayed is included in the currently-displayed area, and stores a movement amount, a rotation amount, and a display enlargement factor of the current image in order to display the currently-displayed area as it is.

Figure 14:
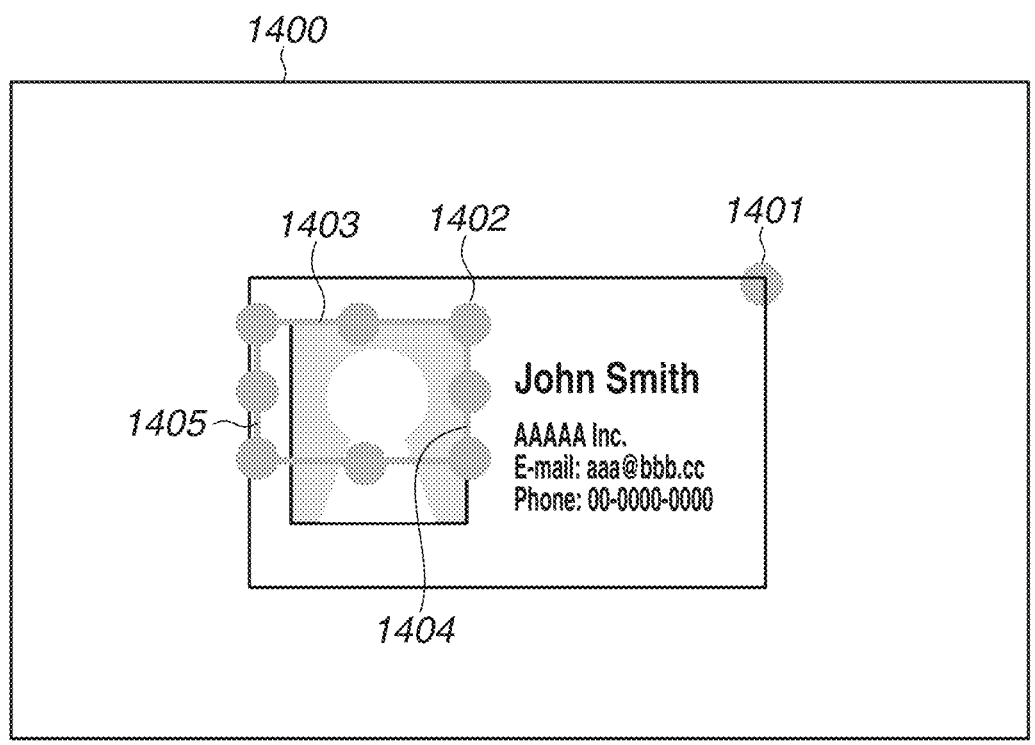
FIG. 14 is a diagram illustrating a repeat target area before change of the output mode according to the second embodiment.
Figure 15:
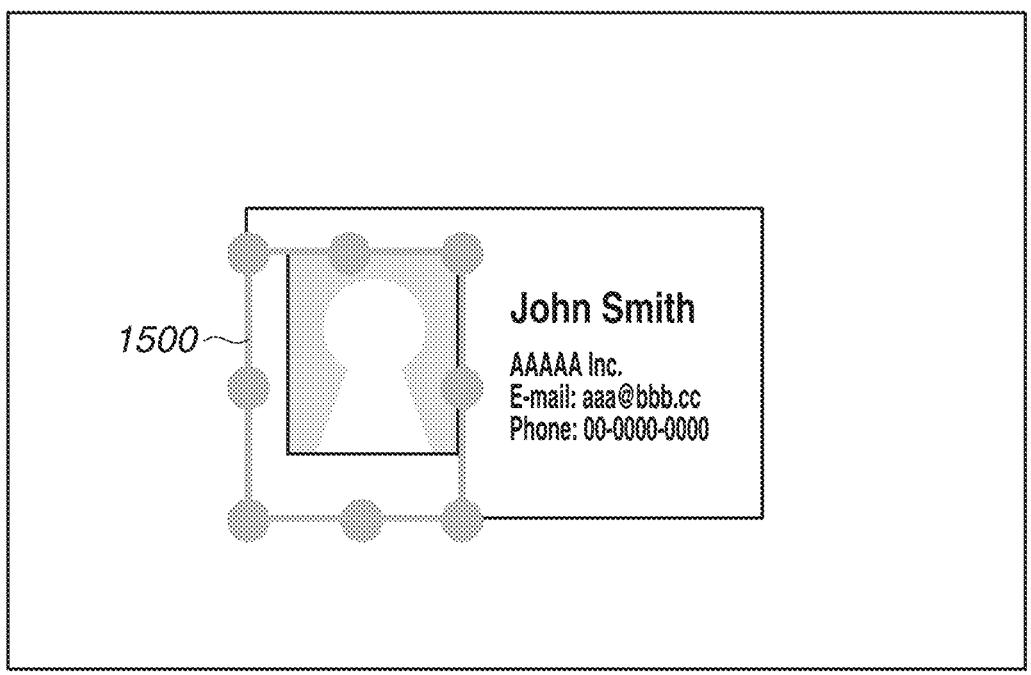
FIG. 15 is a diagram illustrating the repeat target area after the change of the output mode according to the second embodiment.

In a case where the operation relating to the repeat target area designation frame is performed, the CPU 111 changes the contents to the stored based on the operation contents. For example, in a case where an upper-right operation handler 1604 is operated and the frame is moved to a predetermined position among the operations relating to a repeat target area designation frame 1601 illustrated in FIG. 16, the CPU 111 determines that a boundary of the repeat target area intended by the user is located at that position, and stores the boundary relating to the handler. This is described with reference to FIG. 14. In FIG. 14, a display area 1400 corresponds to the display area in FIG. 16. At this time, it is assumed that an upper-right handler is moved from a position 1401 to a position 1402. When the CPU 111 reduces the frame while maintaining the aspect ratio, a frame 1405 indicating the repeat target area is displayed as illustrated in FIG. 14. At this time, an upper line 1403 and a right line 1401 relating to the upper-light handler of the frame 1405 are stored as boundaries. Further, the initial repeat target area in step S305 is displayed to maintain the boundaries. As a result, the initial repeat target area for non-scaling mode is displayed at a position of a frame 1500 in FIG. 15. An upper line and a right line of the frame 1500 are maintained based on the above-described stored boundaries, and a left line and a lower line are generated through combination with use of the document area detected in step S303. In addition to the above-described example, for example, in a case where a lower-left handler is also operated, the lower line and the left line are also stored as the boundaries, and the initial repeat target area is generated with use of the stored boundaries as information in preference to the document area.

As described above, in step S1301, the initial repeat target area is determined based on the operations relating to the image movement, the image rotation, and the display enlargement factor, and the initial repeat target area is determined based on the operation relating to the repeat target area designation frame by the user. Further, the initial repeat target area is generated by combining the generated initial repeat target areas. The processing then proceeds to step S305.

Further, in the second embodiment, in the case where the output mode is changed from the non-scaling mode to the scaling mode in step S307 illustrated in FIG. 13 (CHANGE OUTPUT MODE TO SCALING MODE in step S307), the processing proceeds to step S1302.

Also in step S1302, the user operation information is extracted focusing on the operations relating to image movement, image rotation, a display enlargement factor, and the repeat target area designation frame in a manner similar to step S1301. At this time, the operation contents relating to the image movement, the image rotation, and the display enlargement factor are extracted in a manner similar to step S1301. Further, as for the operation contents by the user relating to the repeat target area designation frame, priorities are given to the user operation when the repeat target area designation screen is initially displayed in step S306.

The priorities are described. As for the above-described boundaries to be stored in association with the handlers for operating the frame indicating the repeat target area, combination patterns of the boundaries are provided. In a case of a pattern in which the boundaries to be stored is one of the upper and lower boundaries, one of the right and left boundaries, or a combination of one of the upper and lower boundaries and one of the right and left boundaries, it is determined that the boundaries important for the user are located on one side. Accordingly, the initial repeat target area is generated so that frame lines are set to maintain the boundaries and the output size becomes the designated output size based on the boundaries.

Further, in a case of a pattern in which both of the upper and lower lines or both of the right and left lines are operated, it is determined that both of lines are boundaries. Accordingly, the frame is designated by scaling the designated output size so as to be coincident with the boundaries. In other words, in the case where the upper and lower lines become the boundaries, the frame is adjusted by the right and left lines while maintaining the boundaries. This operation is similarly performed in a case where the right and left lines become the boundaries. In this case, as compared with the above-described pattern, maintenance of the boundaries is given priority over maintenance of the output size. Further, as for the center position of the rectangle, coordinates of the center of the frame in the horizontal direction in the non-scaling mode are adopted in the case of the upper and lower boundaries, and coordinates in the vertical direction are adopted in the case of the right and left boundaries. The rectangle is uniquely determined based on the boundaries and the center position, and the initial repeat target area is accordingly generated.

Further, a pattern in any of the case where both of the upper and lower lines and one of the right and left lines become the boundaries, the case where both of the right and left lines and one of the upper and lower lines become the boundaries, and the case where all of the upper and lower lines and the right and left lines become the boundaries is described. In this pattern, it is difficult to maintain the designated aspect ratio of the output size while maintaining all of the boundaries in some cases. Accordingly, an operation order is given to the user operations, and the priorities are given in order from the contents finally operated, to set the boundaries.

The priorities relating to the operations are described. In a case where, as a result of the user operations, the left or right line is operated more recently and thus is high in priority, the initial repeat target area is set so as to maintain the left or right boundary. This is true of the upper and lower lines. Further, the adjustment is performed so as to maintain the aspect ratio in operation of the upper and lower lines and the right and left lines low in priority, and the rectangle is then generated. In this case, maintenance of the boundaries is given priority, and the information on the center position of the repeat target area designation frame among the user operations in the non-scaling mode is ignored.

Further, in the case where the priorities are determined from the operation, both of the vertical direction and the horizontal direction can be operated by one operation at the same time as with the operation by the upper right vertex handler 921 in FIG. 9. In the case where the priority of the operation is high, the boundaries by the operation are maintained, the priority about the operation of the boundaries on an opposite side with next high priority is determined, and the adjustment is performed with use of the boundary with the higher priority. In other words, the final operation is performed with use of the upper right vertex handler 921, the upper line and the right line become the boundaries. The priorities are compared between the left line and the lower line in the previous operation. For example, in the case where the priority of the left line is higher than the priority of the lower line, the initial repeat target area is generated while maintaining the aspect ratio so as to be matched with the left, upper, and right three boundaries.

Further, in the case where the operation by the upper right handler is high in priority and the operation by the lower left handler 923 in FIG. 9 is next high in priority, the priorities of the boundaries cannot be determined based on the operation order described above. At this time, it is difficult to maintain the aspect ratio of the output size while maintaining all of the boundaries. Accordingly, a rectangle maintaining the aspect ratio is generated for each of the left and lower boundaries while maintaining the upper and right boundaries that are the operations with high priorities. Out of the rectangles for the left boundary and the rectangle for the lower boundary, the rectangle that has an area close to the area of the size designated as the output size is adopted. The method of setting the priorities according to the present embodiment is not limited to the above-described methods. For example, the user operation may be given priority and the initial repeat target area may be generated so as to maintain all of the boundaries without maintaining the aspect ratio. Further, the initial repeat target area may be generated with use of only the upper and right boundaries while the operation of the lower left handler low in priority is ignored.

As described above, in step S1302, the initial repeat target area is determined based on the operation relating to the image movement, the image rotation, and the display enlargement factor, and the initial repeat target area is determined based on the operation relating to the repeat target area designation frame performed by the user. Further, the initial repeat target area is generated by combining the generated initial repeat target areas. The processing then proceeds to step S306.

In this way, the initial repeat target area matching the intention of the operation performed before the change of the output mode is displayed when the user changes the output mode between the scaling mode and the non-scaling mode, and it is possible for the user to designate the repeat target area while reducing the correction operation after the change of the output mode.

OTHER EMBODIMENTS

The present disclosure is also achieved by supplying software (program) achieving the functions of the above-described embodiments to a system or an apparatus through a network or various kinds of storage media, and causing a computer (or CPU, micro-processer unit (MPU)) of the system or the apparatus to read and execute the program.

Embodiment(s) of the present disclosure can also be realized by a computer of a system or apparatus that reads out and executes computer executable instructions e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may include one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to embodiments, it is to be understood that the disclosure is not limited to the disclosed embodiments. The scope of the following claims is to be accorded the broadest interpretation so as to encompass all such modifications and equivalent structures and functions.

This application claims the benefit of Japanese Patent Application No, 2018-095657, filed May 17, 2018, which is hereby incorporated by reference herein in its entirety.

What is claimed is:
1. An image processing apparatus comprising:
a memory that stores a program; and
at least one processor that executes the program to perform operations including:
designating one of a plurality of modes in a mode designation of repeat layout processing based on a first instruction of a user, wherein the plurality of modes includes a first mode and a second mode, detecting a document area by performing image analysis processing on a scanned image, acquiring an inclination-corrected image by performing inclination correction of the scanned image based on the detected document area, displaying the inclination-corrected image and a frame on a screen, wherein the inclination-corrected image is enlarged and displayed while the detected document area is in focus, wherein, in a case where the first mode is designated in the mode designation and the frame has a first size corresponding to the document area in the enlarged and displayed inclination-corrected image, the frame having the first size is initially displayed on the enlarged and displayed inclination-corrected image, wherein, in a case where the second mode is designated in the mode designation and the frame has a second size of which an aspect ratio is the same as an aspect ratio of an output size designated in the second mode by the user, the frame having the second size is initially displayed on the enlarged and displayed inclination-corrected image, and wherein a size and/or a position of the initially displayed frame having the first size or the second size can be changed based on a second instruction by the user, generating an output image by repeatedly laying out, in a designated sheet size, an image of a repeat target area determined based on the frame being displayed on the screen when an output instruction is designated by the user, and performing control to perform print processing using the generated output image.

2. The image processing apparatus according to claim 1, wherein, in a case where the first mode is designated in the mode designation, the output image is generated by repeatedly laying out, in the designated sheet size, the image of the repeat target area with a non-scaled size.

3. The image processing apparatus according to claim 1, wherein, in a case where the second mode is designated in the mode designation, the initially displayed frame has the second size having the aspect ratio that is the same as the aspect ratio of the output size and has a largest size corresponding to the document area in the inclination-corrected image.

4. The image processing apparatus according to claim 1, wherein, in a case where the mode is changed, the at least one processor (A) newly determines a position of the frame based on information on (i) a position of the frame displayed on the screen before a mode change, (ii) the inclination-corrected image, and (iii) the mode designated in the mode designation, and (B) displays, on the screen, the inclination-corrected image and the frame based on the newly determined position of the frame.

5. A non-transitory computer readable storage medium storing a program to cause a computer to perform a method for an image processing apparatus, the method comprising:

designating one of a plurality of modes in a mode designation of repeat layout processing based on a first instruction of a user, wherein the plurality of modes includes a first mode and a second mode;

detecting a document area by performing image analysis processing on a scanned image;

acquiring an inclination-corrected image by performing inclination correction of the scanned image based on the detected document area;

displaying the inclination-corrected image and a frame on a screen, wherein the inclination-corrected image is enlarged and displayed while the detected document area is in focus, wherein, in a case where the first mode is designated in the mode designation and the frame has a first size corresponding to the document area in the enlarged and displayed inclination-corrected image, the frame having the first size is initially displayed on the enlarged and displayed inclination-corrected image, wherein, in a case where the second mode is designated in the mode designation and the frame has a second size of which an aspect ratio is the same as an aspect ratio of an output size designated in the second mode by the user, the frame having the second size is initially displayed on the enlarged and displayed inclination-corrected image, and wherein a size and/or a position of the initially displayed frame having the first size or the second size can be changed based on a second instruction by the user;

generating an output image by repeatedly laying out, in a designated sheet size, an image of a repeat target area determined based on the frame being displayed on the screen when an output instruction is designated by the user; and performing control to perform print processing using the generated output image.

6. The non-transitory computer readable storage medium according to claim 5, wherein, in a case where the first mode is designated in the mode designation, the output image is generated by repeatedly laying out, in the designated sheet size, the image of the repeat target area with a non-scaled size.

7. The non-transitory computer readable storage medium according to claim 5, wherein, in a case where the second mode is designated in the mode designation, the initially displayed frame has the second size having the aspect ratio that is the same as the aspect ratio of the output size and has a largest size corresponding to the document area in the inclination-corrected image.

8. The non-transitory computer readable storage medium according to claim 5, wherein, in a case where the mode is changed, the at least one processor (A) newly determines a position of the frame based on information on (i) a position of the frame displayed on the screen before a mode change, (ii) the inclination-corrected image, and (iii) the mode designated in the mode designation, and (B) displays, on the screen, the inclination-corrected image and the frame based on the newly determined position of the frame.

9. A method for an image processing apparatus, the method comprising:

designating one of a plurality of modes in a mode designation of repeat layout processing based on a first instruction of a user, wherein the plurality of modes includes a first mode and a second mode;

detecting a document area by performing image analysis processing on a scanned image;

acquiring an inclination-corrected image by performing inclination correction of the scanned image based on the detected document area;

displaying the inclination-corrected image and a frame on a screen, wherein the inclination-corrected image is enlarged and displayed while the detected document area is in focus, wherein, in a case where the first mode is designated in the mode designation and the frame has a first size corresponding to the document area in the enlarged and displayed inclination-corrected image, the frame having the first size is initially displayed on the enlarged and displayed inclination-corrected image, wherein, in a case where the second mode designated in the mode designation and the frame has a second size of which an aspect ratio is the same as an aspect ratio of an output size designated in the second mode by the user, the frame having the second size is initially displayed on the enlarged and displayed inclination-corrected image, and wherein a size and/or a position of the initially displayed frame having the first size or the second size can be changed based on a second instruction by the user;

generating an output image by repeatedly laying out, in a designated sheet size, an image of a repeat target area determined based on the frame being displayed on the screen when an output instruction is designated by the user; and performing control to perform print processing using the generated output image.

10. The method according to claim 9, wherein, in a case where the first mode is designated in the mode designation, the output image is generated by repeatedly laying out, in the designated sheet size, the image of the repeat target area with a non-scaled size.

11. The method according to claim 9, wherein, in a case where the second mode is designated in the mode designation, the initially displayed frame has the second size having the aspect ratio that is the same as the aspect ratio of the output size and has a largest size corresponding to the document area in the inclination-corrected image.

12. The method according to claim 9, wherein, in a case where the mode is changed, the at least one processor (A) newly determines a position of the frame based on information on (i) a position of the frame displayed on the screen before a mode change, (ii) the inclination-corrected image, and (iii) the mode designated in the mode designation, and (B) displays, on the screen, the inclination-corrected image and the frame based on the newly determined position of the frame.

13. An image processing apparatus comprising:
a memory that stores a program; and
at least one processor that executes the program to perform operations including:
detecting a document area by performing image analysis processing on a scanned image,
acquiring an inclination-corrected image by performing inclination correction of the scanned image based on the detected document area,
displaying the inclination-corrected image and a frame on a screen,
wherein the inclination-corrected image is enlarged and displayed while the detected document area is in focus,
wherein the frame initially displayed on the enlarged and displayed inclination-corrected image has a size of which an aspect ratio is the same as an aspect ratio of an output size designated by a user, and
wherein a size and/or a position of the initially displayed frame can be changed based on a second instruction by the user,
generating an output image by laying out, in a designated sheet size, an image of a target area determined based on the frame being displayed on the screen when an output instruction is designated by the user, and
performing control to perform print processing using the generated output image.

14. The image processing apparatus according to claim 13, wherein the initially displayed frame has the size having the aspect ratio that is the same as the aspect ratio of the output size and has a largest size corresponding to the document area in the inclination-corrected image.

15. A non-transitory computer readable storage medium storing a program to cause a computer to perform a method for an image processing apparatus, the method comprising:
detecting a document area by performing image analysis processing on a scanned image;
acquiring an inclination-corrected image by performing inclination correction of the scanned image based on the detected document area;
displaying the inclination-corrected image and a frame on a screen,
wherein the inclination-corrected image is enlarged and displayed while the detected document area is in focus,
wherein the frame initially displayed on the enlarged and displayed inclination-corrected image has a size of which an aspect ratio is the same as an aspect ratio of an output size designated by a user, and
wherein a size and/or a position of the initially displayed frame can be changed based on a second instruction by the user;
generating an output image by laying out, in a designated sheet size, an image of a target area determined based on the frame being displayed on the screen when an output instruction is designated by the user; and
performing control to perform print processing using the generated output image.

\* \* \* \* \*